(12) United States Patent
Asada et al.

(10) Patent No.: US 7,015,965 B2
(45) Date of Patent: Mar. 21, 2006

(54) CCD IMAGING APPARATUS APPLICABLE TO A MULTI-FRAME RATE IMAGE SYSTEM

(75) Inventors: Ryoji Asada, Osaka (JP); Tadami Mine, Osaka (JP); Yasushi Fukushima, Osaka (JP); Shoji Nishikawa, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 923 days.

(21) Appl. No.: 09/880,297

(22) Filed: Jun. 13, 2001

(65) Prior Publication Data

US 2002/0021364 A1 Feb. 21, 2002

(30) Foreign Application Priority Data

Jun. 21, 2000 (JP) ............................. 2000-185832

(51) Int. Cl.
*H04N 5/335* (2006.01)
(52) U.S. Cl. ..................................... 348/312; 348/317
(58) Field of Classification Search ................ 348/312, 348/333.01–333.12, 458, 311, 308, 317; 386/38
See application file for complete search history.

(56) References Cited

U.S. PATENT DOCUMENTS 6,075,565 A * 6/2000 Tanaka et al. ............... 348/312

FOREIGN PATENT DOCUMENTS

| JP | 04-160878 A | | 6/1992 |
|---|---|---|---|
| JP | 04160878 A | * | 6/1992 |
| JP | 11-220727 A | | 8/1999 |
| JP | 11220727 A | * | 8/1999 |
| JP | 11-308535 A | | 11/1999 |
| JP | 2000-165757 A | | 6/2000 |
| WO | WO 200002382 A2 | * | 1/2000 |

* cited by examiner

*Primary Examiner*—Ngoc-Yen Vu
*Assistant Examiner*—Timothy J. Henn
(74) *Attorney, Agent, or Firm*—RatnerPrestia

(57) ABSTRACT

A stable charge coupled device (CCD) imaging apparatus operable in multiple frame rates for displaying a signal having a low frame rate in a viewfinder (VF), and also a recorder built-in type imaging apparatus using the CCD imaging apparatus are presented. The imaging apparatus includes a drive pulse switching circuit for multiplying a CCD drive pulse other than a CCD read pulse by (n/2) (where n is an arbitrary integer) when the multi-frame rate is low, a frame memory for storing an output signal of the CCD of one frame right after pulse output. The signal is read at every (n/2) frames. The frame memory repeats to read out the stored signal in one frame (n/2) times. The imaging apparatus further includes a camera signal processing circuit for performing a camera process to an output signal of the frame memory, and a recorder unit for recording an output signal of the camera signal processing circuit at the frame rate of the set mode. As a result, even at a low frame rate, the apparatus displays a signal in the VF. And with a properly-selected value of n, the apparatus conducts a signal having various frame rate between a camera and the recorder at a common frame rate.

14 Claims, 20 Drawing Sheets

CCD IMAGING APPARATUS APPLICABLE TO A MULTI-FRAME RATE IMAGE SYSTEM

FIELD OF THE INVENTION

The present invention relates to a charge coupled device (CCD) imaging apparatus for a broadcasting and professional use, and a recorder built-in type imaging apparatus using the CCD imaging apparatus and a recorder such as video cassette recorder (VCR), and particularly to an imaging apparatus applicable to a multi-frame rate high definition (ID) image system.

BACKGROUND OF THE INVENTION

The multi-frame rate HD image system is standardized in the SMPTE274M and SMPTE296M by the Society of Motion Picture and Television Engineers (SMPTE). The HD image system is classified into two types according to the total number of scanning lines, that is, 1125 and 750. In the former type, the number of effective lines is 1,080, the number of effective horizontal pixels is 1,920, the total number of horizontal pixels is 2200, a clock frequency is 74.25 MHz or 74.25/1.001 MHz, a scanning system is basically an interlacing scanning, and hence a field frequency is 60 Hz or 59.94 Hz.

Owing to recent development of HD broadcasting equipment, a movie is converted into electronic medium, that is, an electronic cinema system in which a film is replaced with a video tape is realized. As a result, the broadcasting equipment is required to be applicable to both a field frequency of 60 Hz interlacing scanning mode (60$i$ mode) for a television and a frame frequency 24 Hz progressive scanning mode (24$p$ mode) for the movie. Therefore, For an interface between appliances, it has been proposed to add modes in which a frame frequency changes by an increase of the number of ineffective horizontal pixels without changing the clock frequency and the number of horizontal effective pixels. The added frame frequency and scanning systems include a 30$p$ mode, a 25$p$ mode, and a 24$p$ mode. The total number of horizontal pixels, for example in the 30$p$ mode, is 2,200, the same as in the 60$i$ mode, and 2,750 (2200×30/24) in the 24$p$ mode.

In the type of the total number of lines of 750, the number of effective lines is 720, the number of effective horizontal pixels is 1,280, the total number of horizontal pixels is 1,650, a clock frequency is 74.25 MHz or 74.25/1.001 MHz, a scanning system is basically progressive scanning, and hence a frame frequency is 60 Hz or 59.94 Hz. In this type, similarly to the type of total number of lines of 1,080, a 50$p$ mode, a 30$p$ mode, a 25$p$ mode, a 24$p$ mode and others have been added. The number of horizontal pixels is 3,300 in the 30$p$ mode, and 4,125 in the 24$p$ mode.

A circuit diagram of a conventional multi-frame rate applicable VCR built-in type imaging apparatus is shown in FIG. 19, and an operation will be explained below by referring to FIG. 20.

A drive pulse generator 53 generates a drive pulse corresponding to a mode according to a mode switching signal issued from, for example, a microcomputer (not shown) and sends the pulse to a CCD driver 52. The CCD driver 52 converts the drive pulse into a specified voltage, and drives a CCD 51.

For example, when a 60$i$ mode is selected, a drive pulse shown in FIG. 20B is generated. In this case of the interlace scanning, a CCD read pulse is issued in every 1/60 second, and after the reading out, two signals of upper and lower pixels are mixed in photo diodes (PDs). Herein, signals are changed in mixing pair in every field, and signals of odd and even lines are produced. Mixed signals are vertically transferred in every line in one horizontal scanning period with a vertical transfer pulse, and are sequentially issued at a rate of a drive clock (74 MHz) in every vertical transfer pulse by the horizontal transfer pulse (not shown). In a first field, an odd line signal is issued, and in a next field, similarly, an even line signal is issued. Then, as shown in FIG. 20A, a signal of one frame (1/30 second) is formed.

Two methods for reading out signals of, for example, the 30$p$ mode will be explained.

In the first method, signals are read out in every 1/30 second with a drive pulse shown in FIG. 20D. Then, signals of all lines which are not mixed in PD are sequentially issued with the vertical transfer pulse and horizontal transfer pulse (not shown) in one frame period, and the signal of the 30$p$ mode shown in FIG. 20C is obtained.

Herein, if the CCD 51 is of an interline (IT) type, the signal read out from the PD is transferred through a vertical CCD in every line in one horizontal scanning period. When the CCD captures a bright object such as a spotlight, due to a leak of the light from the photo sensor composed of the PD to the vertical transfer unit composed of the CCD, a bright stripe, i.e., so-called a smear is often generated.

A frame interline transfer (FIT) type CCD is known as a CCD capable of suppressing the smear. This CCD includes an accumulator aside from the vertical CCD and horizontal CCD. Right after all pixel signals are read out from the PD, they are transferred to the accumulator with a high speed transfer pulse in a vertical blanking time, and then, similarly to the IT type CCD, signals are sequentially issued with the vertical transfer pulse and horizontal transfer pulse. This CCD suppresses the smear by the high speed transfer, however generates a vertical black shading due to a dark current in the accumulator.

To obtain a progressive output in the total number of horizontal pixels of 1,080, for vertically-transferring all pixel signals, the vertical CCD needs to be driven with double numbers of transfer electrodes than that in an interlace scan. Therefore a transferring capacity decreases. The FIT type CCD, further, requires double stages of the high speed transfer. In order to assure a performance, a frequency or transfer time of the high speed transfer is limited. At the present, the frequency is limited to the frame rate of the 30$p$ (60$i$) mode.

In the second method, to solve the problem of the transfer capacity, the CCD of multiple frame interline transfer (MFIT) type is developed and achieves a practical level for a progressive scanning. This CCD reads out and transfers a signal group of odd lines in the vertical blanking period at high speed, and then, reads out and transfers a signal group of even lines at high speed. The accumulator accumulates the signal groups of odd lines and even lines separately. In order to obtain signals of a progressive scanning, signals must be arranged properly in a frame memory or the like. In the case that signals are not arranged, after the high speed transfer with the vertical transfer pulse shown in FIG. 20F, 30$p$ mode signals are sent out separately in odd and even fields in the interlacing system (a high speed transfer pulse after the read pulse is not shown). This is known as a segment frame (SF) system.

The interlace signal in FIG. 20A and progressive signal in FIG. 20C or FIG. 20E are issued from the CCD 51, and put into a camera signal processing circuit 54. The circuit 54 performs a specified camera process corresponding to the interlacing system or progressive system, and sends a signal for viewfinder (VF) to a VF 55, and a signal for recording to a VCR unit 56. The VF 55 displays an image corresponding to the interlacing system or progressive system, and the VCR unit 56 records and reproduces the signal depending on the mode switching signal.

In the conventional VCR built-in type imaging apparatus applicable to multi-frame rate, the VF displays the image of the progressive signal of the 30p mode, 25p mode, or 24p mode with flickering, which affects the image, because of the low frame rate. Even in the SF system, an interlacing flicker occurs which particularly makes a moving object be hardly observed because of a time difference between odd lines and even lines.

The lower the frame rate in the 25p mode, 24p mode and so on, the more the performance of the CCD deteriorates because the low frame rate increases the smear in the IT type CCD or the vertical black shading in the MFIT type CCD.

In a certain recording mode, for example, in the 24p mode, a signal is recorded at various frame rates and reproduced in the 24p mode, and thus, a variable speed reproduced signal of the 24p mode is obtained. This case requires plural interface (I/F) specifications for the camera driving mode and the VCR, and makes the circuit larger in scale. Therefore, this hardly assures both stability and reliability, and thus, is not practicable. In particular, the variable speed reproduction for the 24p mode is an essential condition for the electronic movie, and thus, is a serious issue.

SUMMARY OF THE INVENTION

A charge coupled device (CCD) imaging apparatus capable of easily observing an image with a viewfinder (VF) even at a low frame rate and applicable to a multi-frame rate is provided. The apparatus does not affects a performance of the CCD and capable of a various speed reproducing.

The imaging apparatus includes a CCD operable in a progressive scanning, a drive pulse switching circuit for generating a CCD drive pulse at a predetermined first frame rate, a CCD driver for driving the CCD by converting the CCD drive pulse into a specified voltage, a frame memory for storing the CCD output signal, and a camera signal processing circuit for receiving an output of the frame memory and performing a specified camera process. The drive pulse switching circuit generates a CCD read pulse of the CCD drive pulse at the first frame rate, and generates other CCD drive pulse than the CCD read pulse at a frame rate of (n/2) of the first frame rate (where n is an arbitrary integer). The frame memory stores a signal of one frame issued by the CCD after the CCD read pulse, and repeats to read out the signal (n/2) times.

DESCRIPTION OF THE PREFERRED EMBODIMENTS (Exemplary Embodiment 1)

Figure 1:
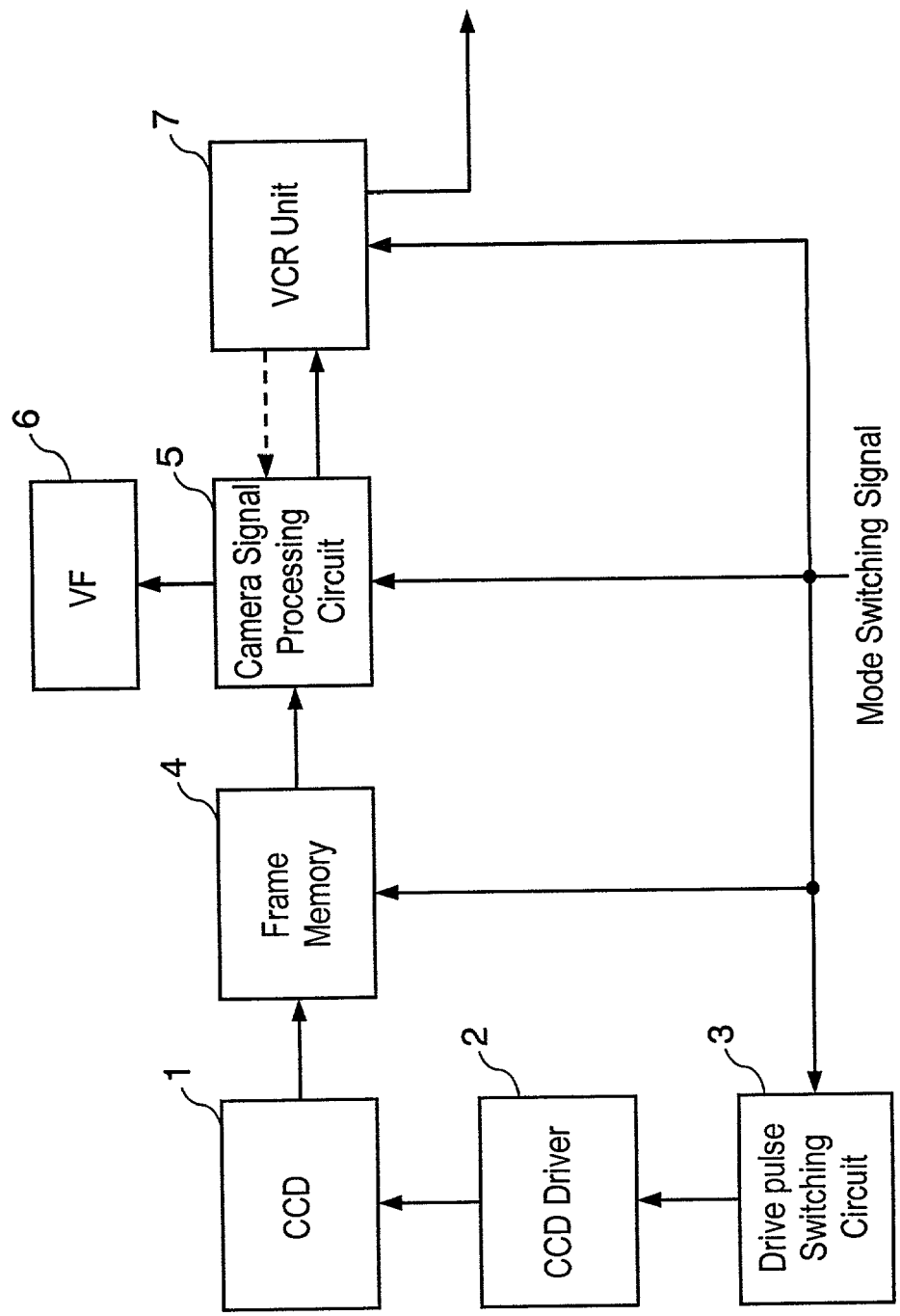
FIG. 1 is a block diagram of a video cassette recorder (VCR) built-in type imaging apparatus according to exemplary embodiment 1 of the present invention.

FIG. 1 is a block diagram of a video cassette recorder (VCR) built-in type imaging apparatus according to exemplary embodiment 1 of the present invention. The imaging apparatus includes a CCD 1 operable in a progressive scanning, a CCD driver 2, a drive pulse switching circuit 3 for changing over and issuing a CCD drive pulse corresponding to a multi-frame rate, a frame memory 4, a camera signal processing circuit 5 for performing a camera process, a viewfinder (VF) 6 operable in the progressive scanning, and a VCR unit 7 for recording and reproducing a multi-frame rate signal.

Figure 2:
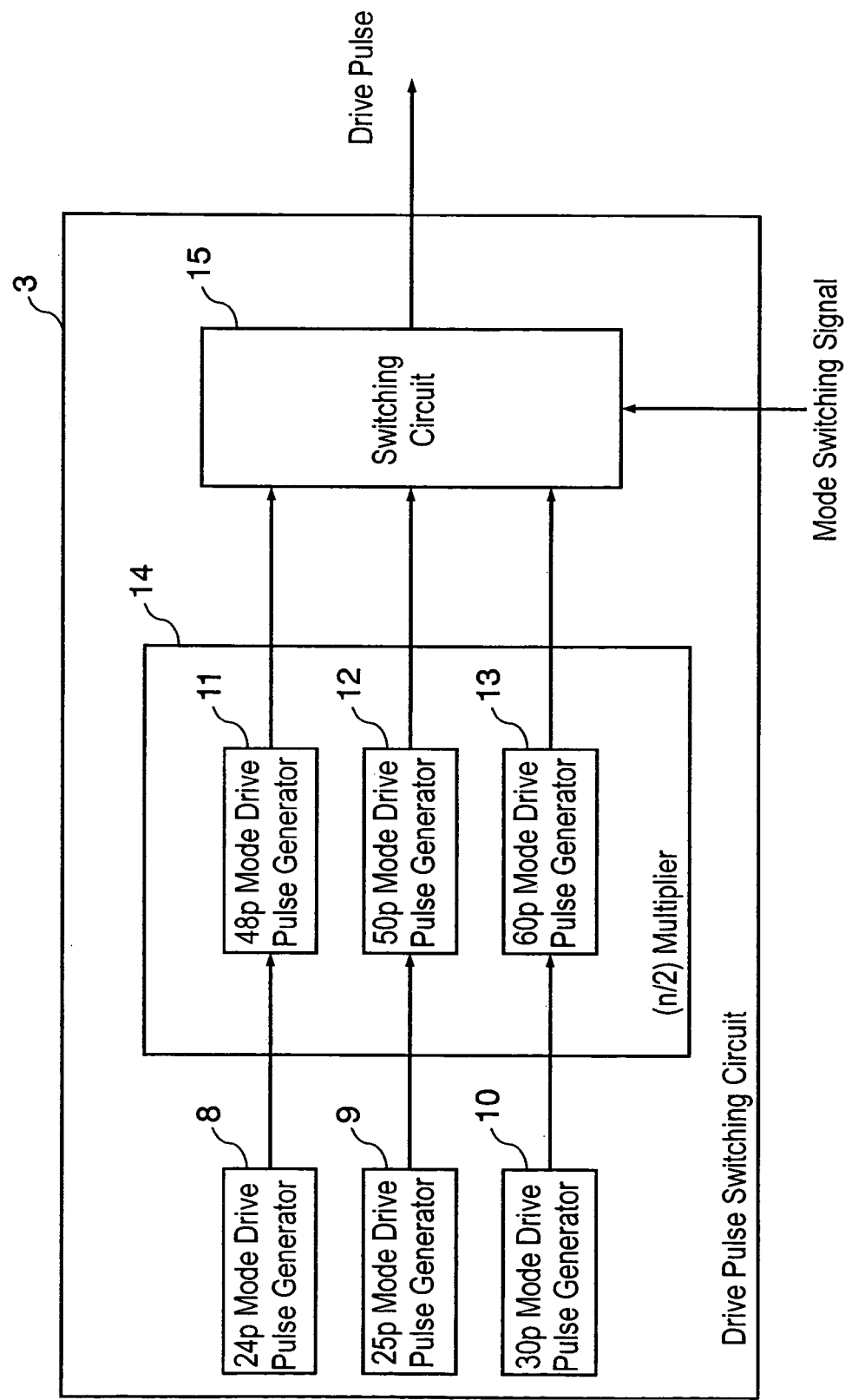
FIG. 2 is a block diagram of an internal structure of a drive pulse switching circuit in the imaging apparatus according to embodiment 1.
Figure 3:
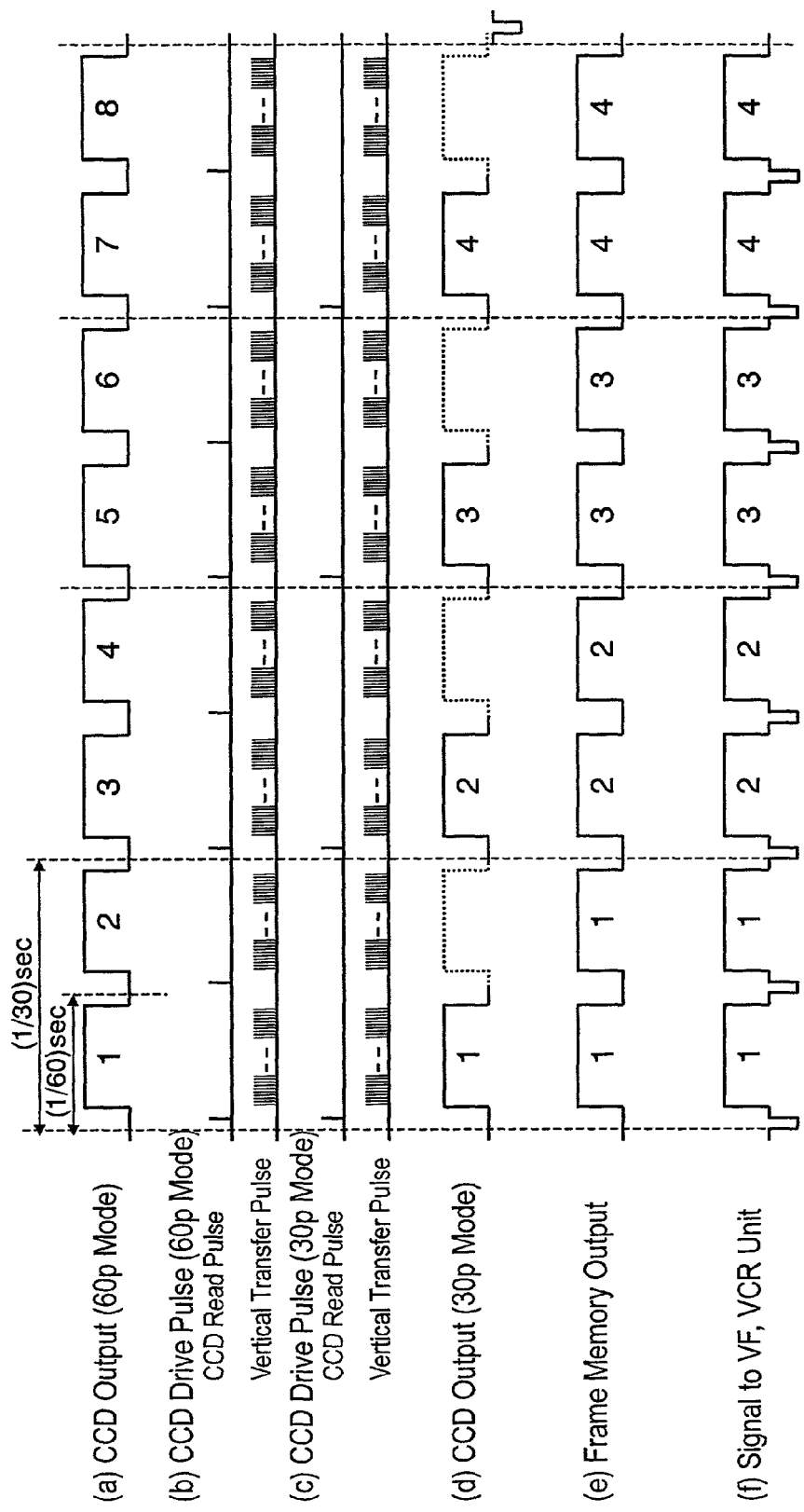
FIG. 3 is a signal waveform diagram of the imaging apparatus shown in FIG. 1.
Figure 4:
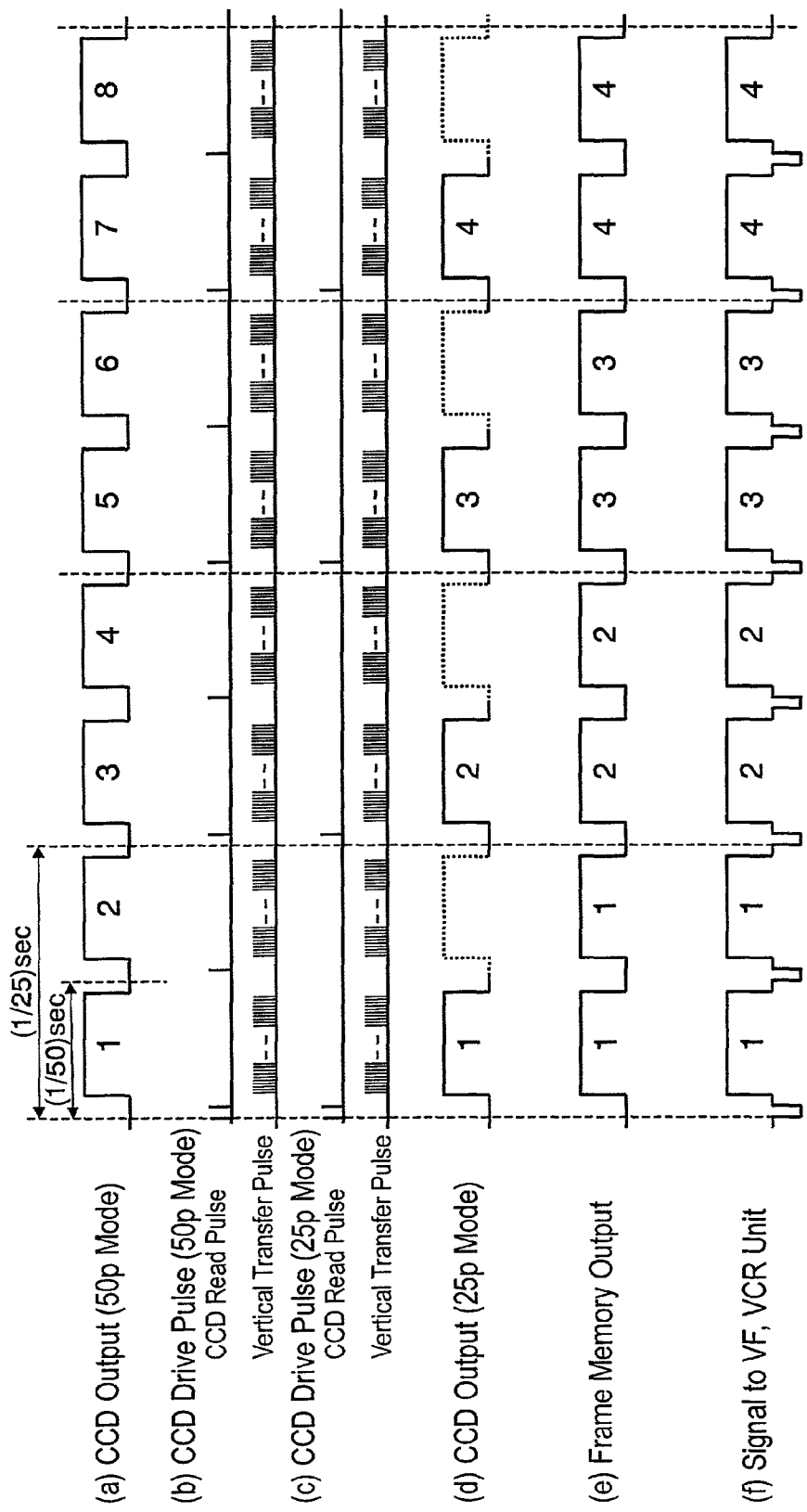
FIG. 4 is a signal waveform diagram of the imaging apparatus shown in FIG. 1.

The operation of the VCR built-in type imaging apparatus in embodiment 1 will be explained by referring to FIG. 2 through FIG. 4. FIG. 2 is a block diagram of an internal structure of the drive pulse switching circuit of the imaging apparatus. FIG. 3 and FIG. 4 are signal waveform diagrams of the imaging apparatus in FIG. 1.

As shown in FIG. 2, the drive pulse switching circuit 3 includes drive pulse generators 8, 9, 10 for generating CCD drive pulses corresponding to a 24p mode, a 25p mode, and a 30p mode, respectively, an (n/2) multiplier 14, and a switching circuit 15. The (n/2) multiplier 14 includes drive pulse generators 11, 12, 13 for receiving pulses from the drive pulse generators 8, 9, 10, and doubling the rate of CCD drive pulses other than CCD read pulses.

In FIG. 1, a mode switching signal is issued from a microcomputer or the like (not shown). The drive pulse switching circuit 3 receives it, and for example, as shown in FIG. 2, the 25p drive pulse generator 9 generates a CCD drive pulse in the 25p mode, the 30p drive pulse generator 10 generates a CCD drive pulse in the 30p mode. And then, the (n/2) multiplier 14 generates a double-rate CCD drive pulse, a 50p mode drive pulse and a 60p mode drive pulse in the case of n=4, respectively. These drive pulses are shown in FIG. 3 and FIG. 4. For example, in the 30p mode drive pulse shown in FIG. 3(c), a CCD read pulse has a frame rate of the 30p mode, which is different from the 60p mode drive pulse shown in FIG. 3(b). A vertical transfer pulse and horizontal transfer pulse (not shown) are the same as the 60p mode drive pulses. Therefore, the CCD driver 2 for converting the drive pulse from the drive pulse generator 3 to a specified voltage has the CCD 1 output a signal at the same frame rate as in the 60p mode in FIG. 3(a) as shown in FIG. 3(d). That is, the signal is issued in one frame right after the CCD read pulse, and an undesired signal is issued in the next frame. In the frame memory 4, the signal of one frame right after the CCD read pulse is written, and the signal of the frame is read out twice, and the signal as shown in FIG. 3(e) is obtained. In FIG. 3, meanwhile, a delay by the frame memory is not shown.

This signal is sent into the camera signal processing circuit 5 of the next stage, in which a specified camera process is performed at a frame rate of the 60p mode. And then, a signal as shown in FIG. 3(f) is issued to the VF 6 and VCR unit 7. The VF 6 displays the image of the signal at a frame rate of the 60p mode, and the VCR unit 7 records the image at a frame rate of the 60p mode as a 30p signal converted in mode by adjusting the recording speed, etc.

Similarly in the 25p mode, signal waveforms are shown in FIG. 4(a) through FIG. 4(f). The VF 6 displays an image at a frame rate of the 50p mode. The VCR unit 7 records an image at the 50p frame rate as a 25p signal by adjusting the recording speed. In the 24p mode, basically, the same process is performed.

Thus, according to embodiment 1, when a preset frame rate is 30 frames/sec or less, the VF displays an image at a frame rate of (n/2) times of the preset rate (where n is an integer), for example, at a double of the preset rate. Therefore, the VF displays the image without flicker. Further, the CCD signal is vertically transferred in a short time, and thus prevents a performance of the CCD from deterioration.

The drive pulse generators in the drive pulse switching circuit 3 may be realized with a single circuit capable of generating a necessary pulse with being controlled programmably.

(Exemplary Embodiment 2)

Figure 5:
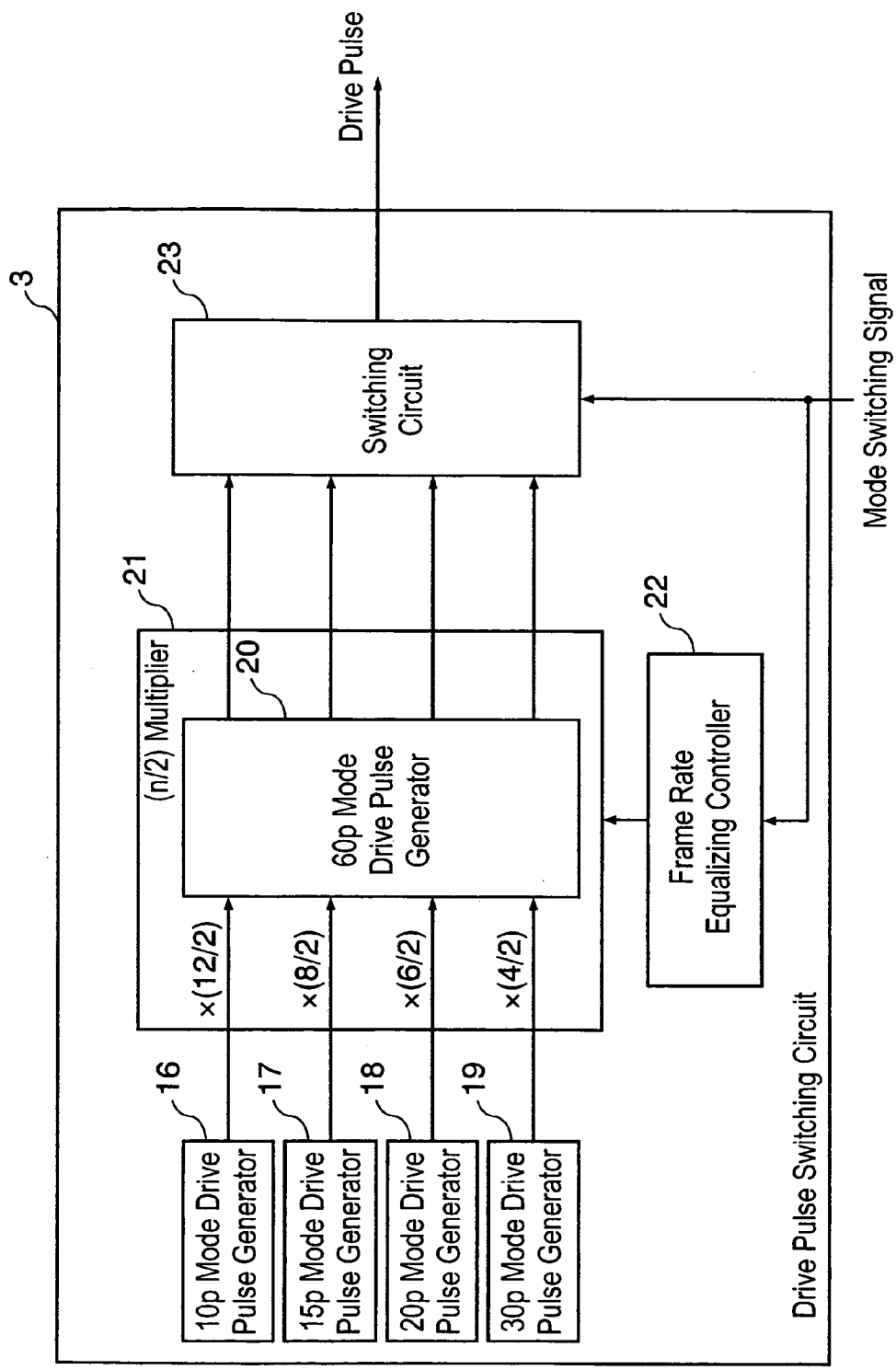
FIG. 5 is a block diagram of a drive pulse switching circuit in a VCR built-in type imaging apparatus according to exemplary embodiment 2 of the present invention.

FIG. 5 is a block diagram of a drive pulse switching circuit 3 in a video cassette recorder (VCR) built-in type imaging apparatus in exemplary embodiment 2 of the present invention. Drive pulse generators 16, 17, 18, 19 generate CCD drive pulses in a 10p mode, 15p mode, 20p mode, and 30p mode, respectively. A 60p drive pulse generator 20 converts the frame rate of other pulses than a CCD read pulse from the drive pulse generators 16, 17, 18, 19 to pulses at a frame rate of the 60p mode. An (n/2) multiplier 21 is composed of the 60p drive pulse generator according to this embodiment. A frame rate equalizing controller 22 controls the multiplier for converting frame rates of the 10p mode, 15p mode, 20p mode, and 30p mode commonly to 60p. The drive pulse switching circuit 3 further includes a switching circuit 23. Embodiment 2 differs from embodiment 1 in that the frame rate equalizing controller 22 is provided in the drive pulse switching circuit 3. The other circuits and operations are the same.

Figure 6:
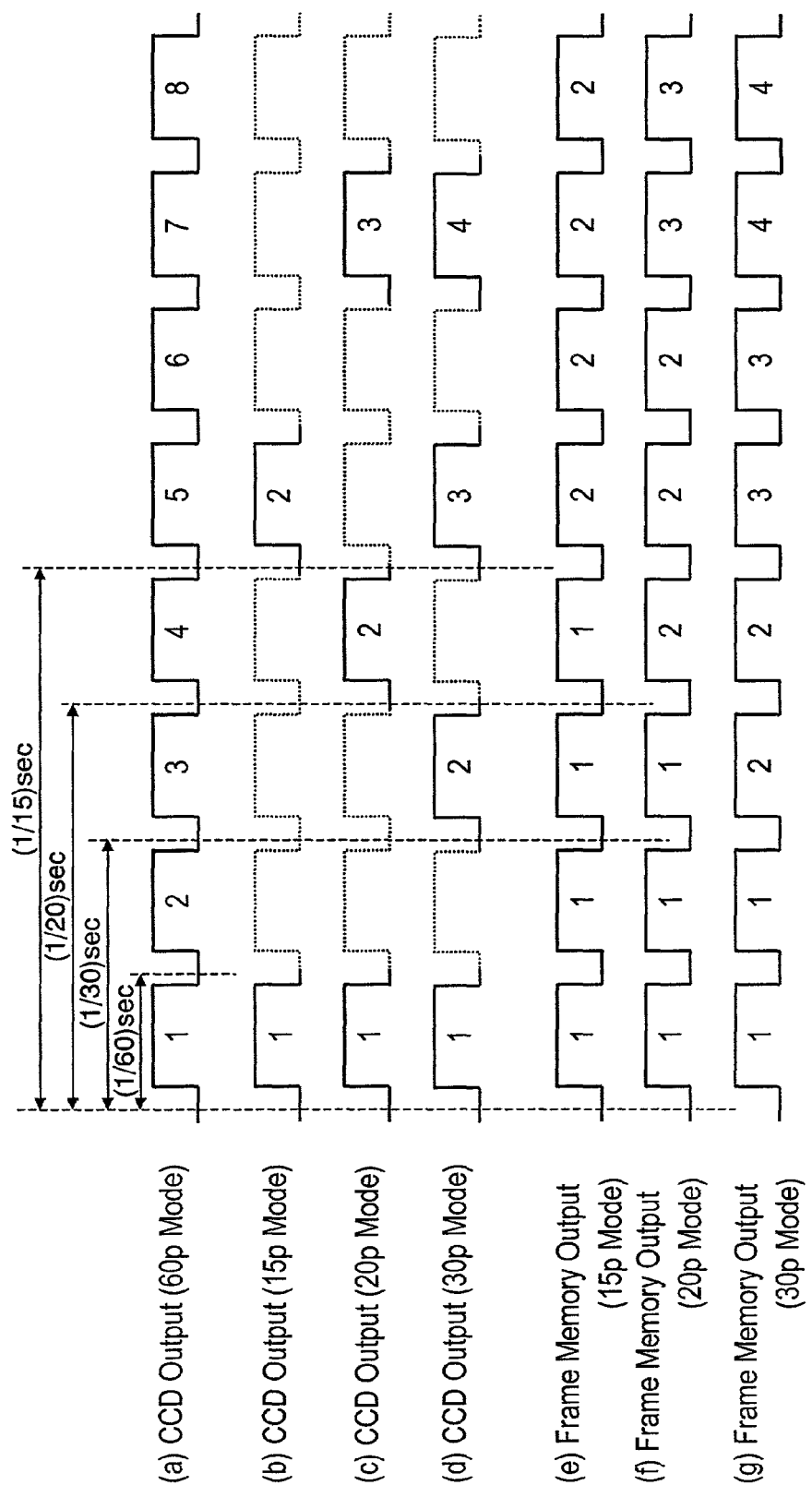
FIG. 6 is a signal waveform diagram for explaining an operation of the imaging apparatus according to embodiment 2.
Figure 7:
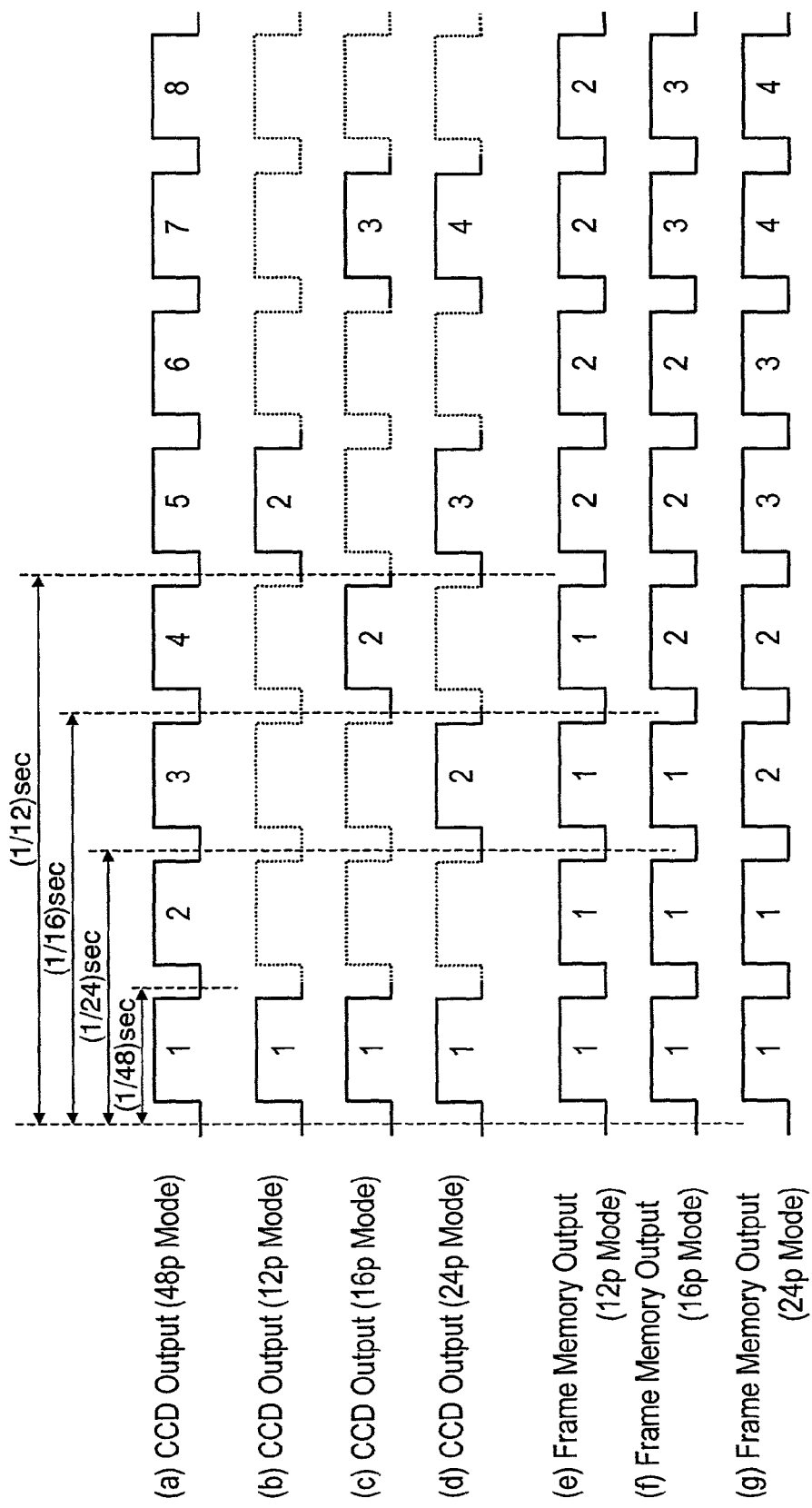
FIG. 7 is a signal waveform diagram for explaining the operation of the imaging apparatus according to embodiment 2.

An operation of the VCR built-in type imaging apparatus according to embodiment 2 will be explained by referring to FIG. 6 and FIG. 7.

The frame rate equalizing controller 22 selects a value of n in the (n/2) multiplier 21 depending on a rate of an input CCD drive pulse. For example, the controller 22 sets the value of n to 12 in the 10p mode, 8 in the 15p mode, 6 in the 20p mode, and 4 in the 30p mode, so that the all modes may be converted to the 60p mode. At this time, a rate of the CCD read pulse remains in the input frame rate, same as in embodiment 1, and rates of other CCD drive pulses are converted to a frame rate of the 60p mode. The converted drive pulses are selected and issued by the switching circuit 23 according to a mode switching signal. By this drive pulse, as shown in FIG. 6(b), FIG. 6(c), and FIG. 6(d), the CCD outputs a signal at the same rate as that of the 60p mode shown in FIG. 6(a). The dotted line indicates undesired signal output period. (The 10p mode is not shown.) As shown in FIG. 6(e), FIG. 6(f), and FIG. 6(g), the frame memory stores a signal of one frame right after the CCD read pulse in an output of the CCD. And then, the memory outputs the signal of one frame repeatedly so as to fill up the undesired signal output period indicated by the dotted line. This signal is sent into the camera signal processing circuit and issued to the VF and VCR unit.

FIG. 7(a) through FIG. 7(g) show outputs of the CCD and frame memory when the common frame rate is set to that in the 48p mode. In this case, the 12p mode, 16p mode, and 24p mode may be selected with the mode switching signal. Thus, the common frame rate of the 60p mode or 48p mode enables signals of plural frame rates other than standard frame rates to be selected as a recording signal for the VCR unit.

Thus, according to embodiment 2, similarly to embodiment 1, even a signal of a low speed frame rate can be displayed in a common frame rate on the VF without deteriorating the performance of the CCD. The VCR unit records a signal of an actual frame rate corresponding to the common frame rate with changing a recording speed so as to record the signal at a specified recording rate (format) depending on the rate. And the VCR unit reproduces the signal at the specified rate, and thus, reproduces the signal at a variable speed.

Further, the apparatus supplies signals of plural frame rates to the VCR unit and VF at the common frame rate, and thus, has the circuit scale reduced, and has the stability enhanced.

The drive pulse generators in the drive pulse switching circuit 3 may be realized by a single circuit, similarly to embodiment 1, capable of generating a necessary pulse with being controlled programmably.

(Exemplary Embodiment 3)

Figure 8:
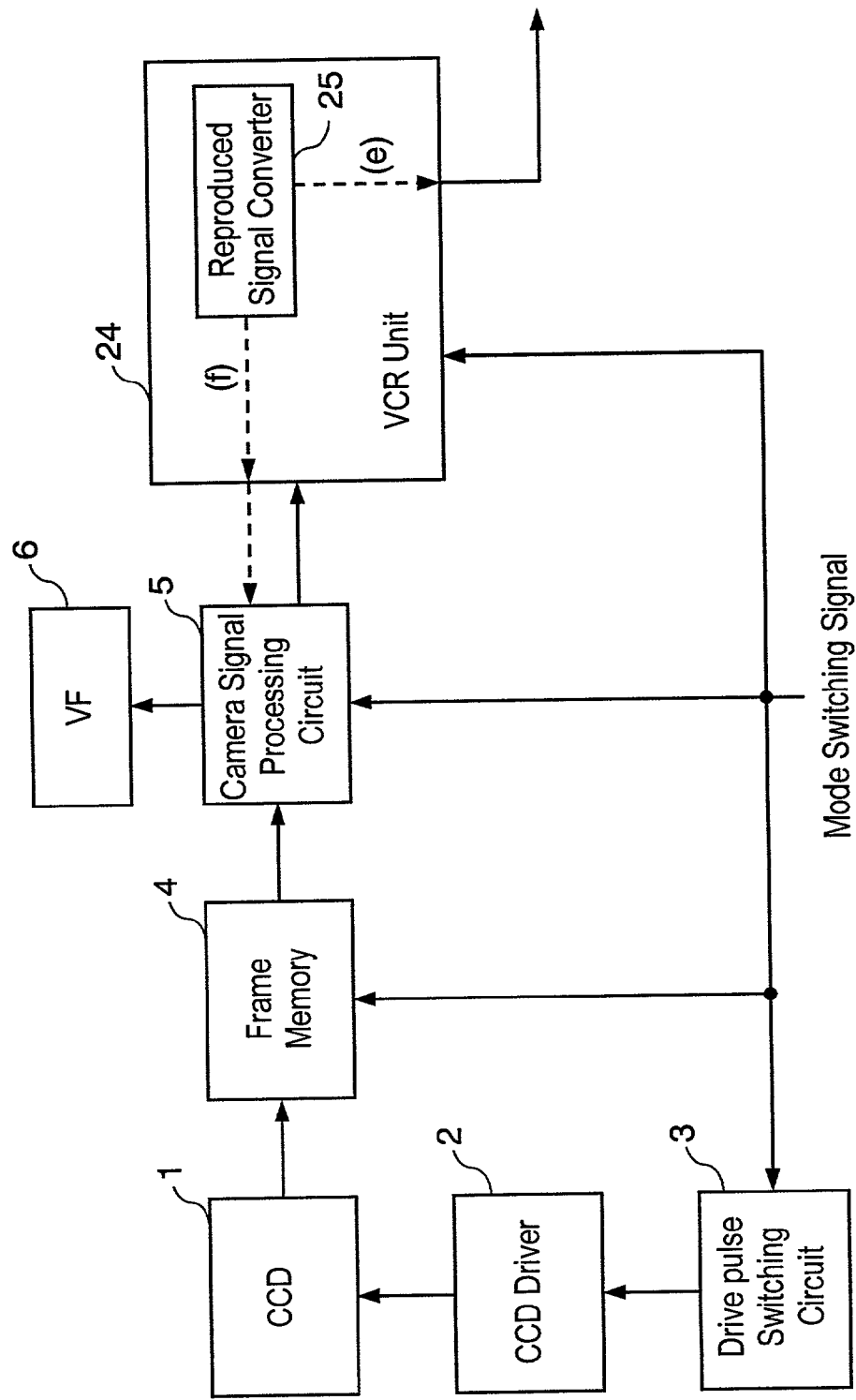
FIG. 8 is a block diagram of a VCR built-in type imaging apparatus according to exemplary embodiment 3 of the present invention.

FIG. 8 is a block diagram of a video cassette recorder (VCR) built-in type imaging apparatus according to exemplary embodiment 3 of the present invention. The imaging apparatus includes a charge coupled device (CCD) 1 operable for a progressive scanning, a CCD driver 2, a drive pulse switching circuit 3 for selecting and issuing a CCD drive pulse corresponding to a multi-frame rate, a frame memory 4, a camera signal processing circuit 5 for performing a camera process, a viewfinder (VF) 6 operable in a progressive scanning, a VCR unit 24 for recording and reproducing a multi-frame rate signal, and a reproduced signal converter 25 for converting the frame rate of a reproduced signal.

The same component as that in the imaging apparatus according to embodiment 1 shown in FIG. 1 is denoted with the same reference numeral, and the explanation will be omitted. The difference from the imaging apparatus according to embodiment 1 in FIG. 1 is that the VCR unit 24 includes the reproduced signal converter 25.

Figure 9:
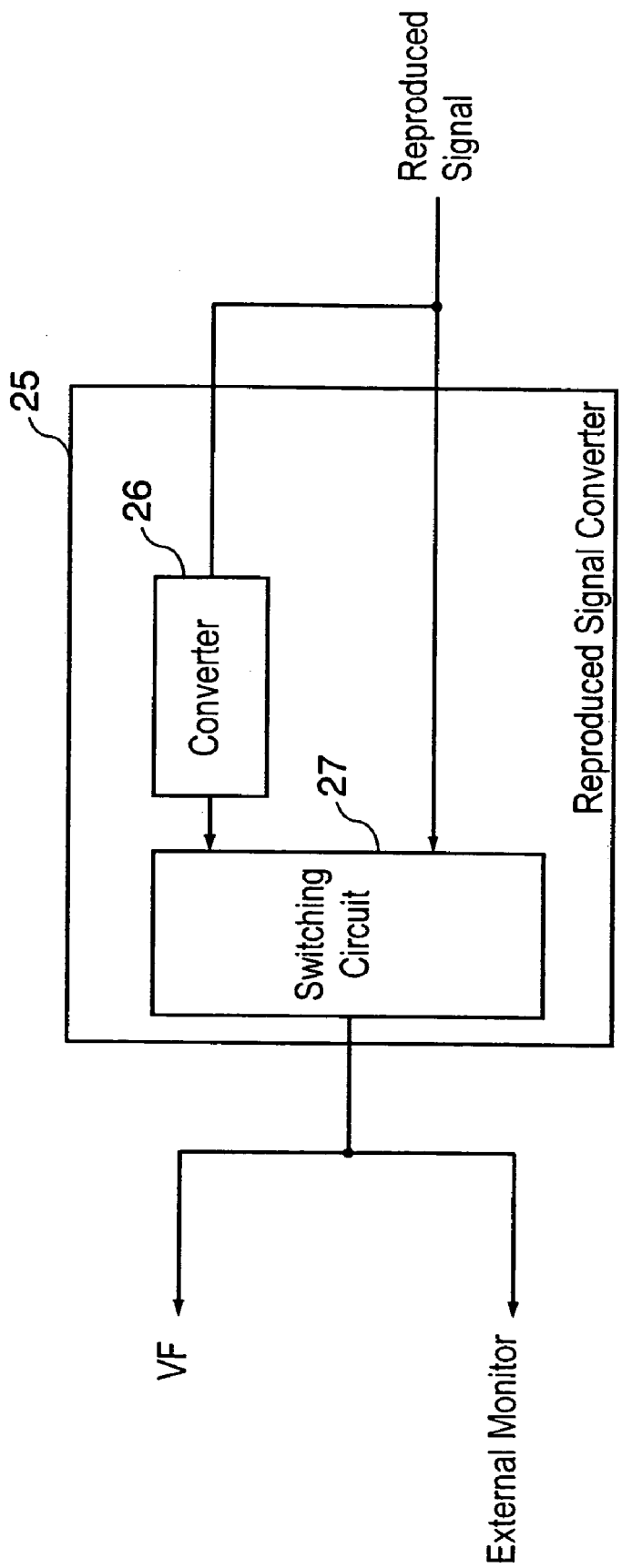
FIG. 9 is a block diagram of an internal structure of a reproduced signal converter of the imaging apparatus according to embodiment 3.

FIG. 9 is a block diagram of the reproduced signal converter 25 according to embodiment 3, in which the converter 25 includes a converter 26 for converting the frame rate of the reproduced signal, and a switching circuit 27.

The operation of the VCR built-in type imaging apparatus having such configuration according to embodiment 3 will be explained.

The operation of other parts than the VCR unit of the VCR built-in type imaging apparatus of embodiment 3 shown in FIG. 8 is the same as the operation of embodiment 1. That is, a signal for the VF issued from the camera signal processing circuit 5 is a signal converted to a set frame rate multiplied by (n/2), and the same signal is issued also to the VCR unit 24. The VCR unit 24 records the signal at the frame rate set by the mode switching signal, and reproduces the signal. Then, the signal mode is converted in the reproduced signal converter 25. The converter 26 in FIG. 9 converts the reproduced signal, from the frame rate set with the mode switching signal to the same frame rate as that entering in the VCR unit 24. This signal and the reproduced signal before the conversion are selected and issued by the switching circuit 27.

In the VCR built-in type imaging apparatus, the reproduced signal is often issued to an outside as a monitor signal of the VF of camera. In this embodiment, when the reproduced signal is checked by the VF or issued to an external monitor, the signal from the converter 26 is selected. When the reproduced signal is issued to an external VCR, switcher or the like, the signal before the conversion is selected.

Thus, according to embodiment 3, when the reproduced signal is issued to the VF, external monitor or the like, the signal of the frame rate multiplied by (n/2) selected with the mode switching signal, for example, the rate multiplied by two, is issued, and is displayed on the VEF without flickering. To an external device, e.g. other external VCR or switch, the signal is issued at the frame rate selected with the mode switching signal, so that the signal conforming to the standard may enter into the external device.

(Exemplary Embodiment 4)

Figure 10:
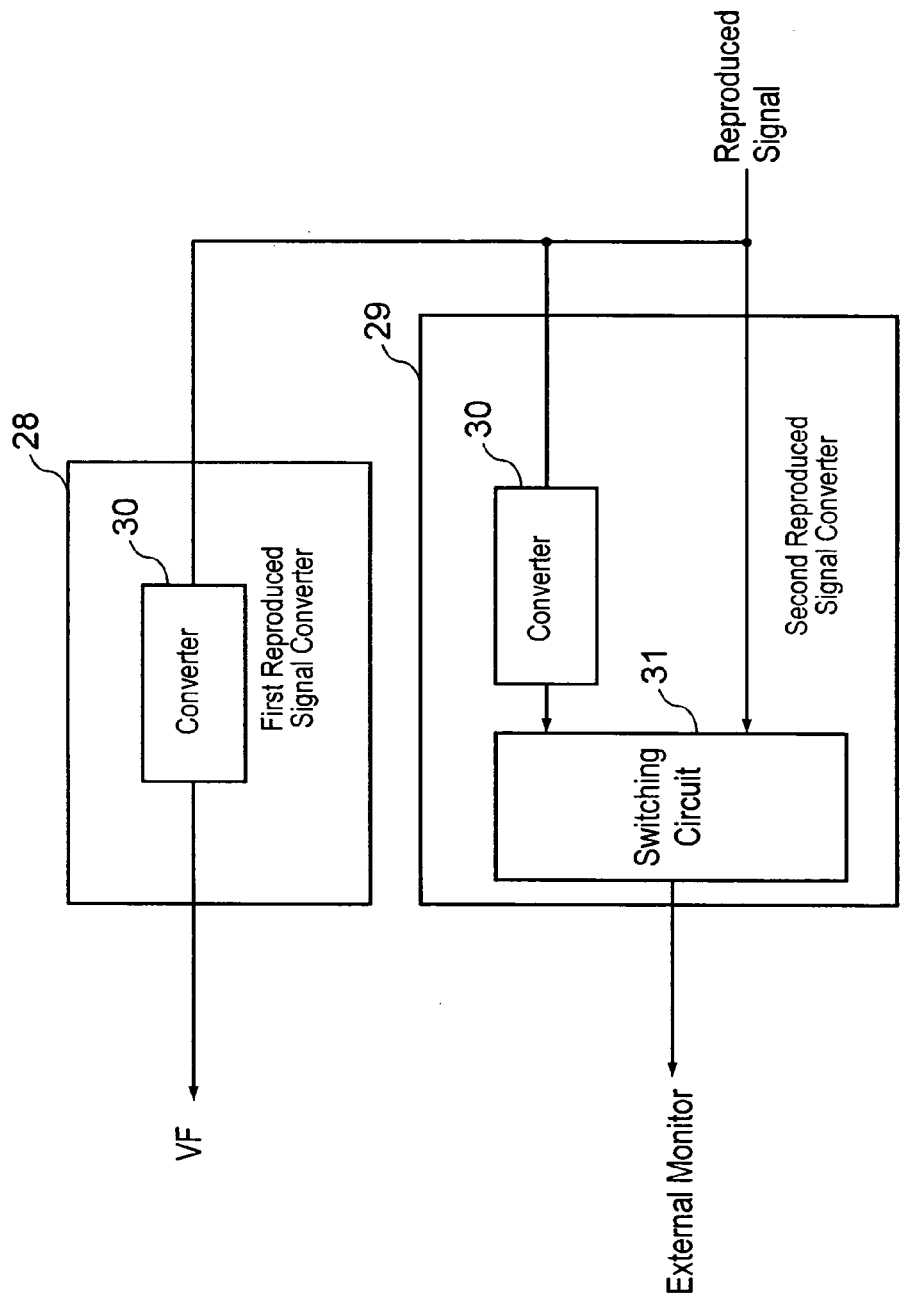
FIG. 10 is a block diagram of an internal structure of a reproduced signal converter of an imaging apparatus according to exemplary embodiment 4 of the present invention.

FIG. 10 is a block diagram of a reproduced signal converter in a videocassette recorder (VCR) unit of a VCR built-in type imaging apparatus according to exemplary embodiment 4 of the present invention. The other components is the same as in embodiment 3 in FIG. 8. What differs from embodiment 3 in FIG. 8 is that a first reproduced signal converter 28 and a second reproduced signal converter 29 are provided. The reproduced signal of the VCR unit will be explained by referring to FIG. 11, and an explanation of other components will be omitted.

Figure 11:
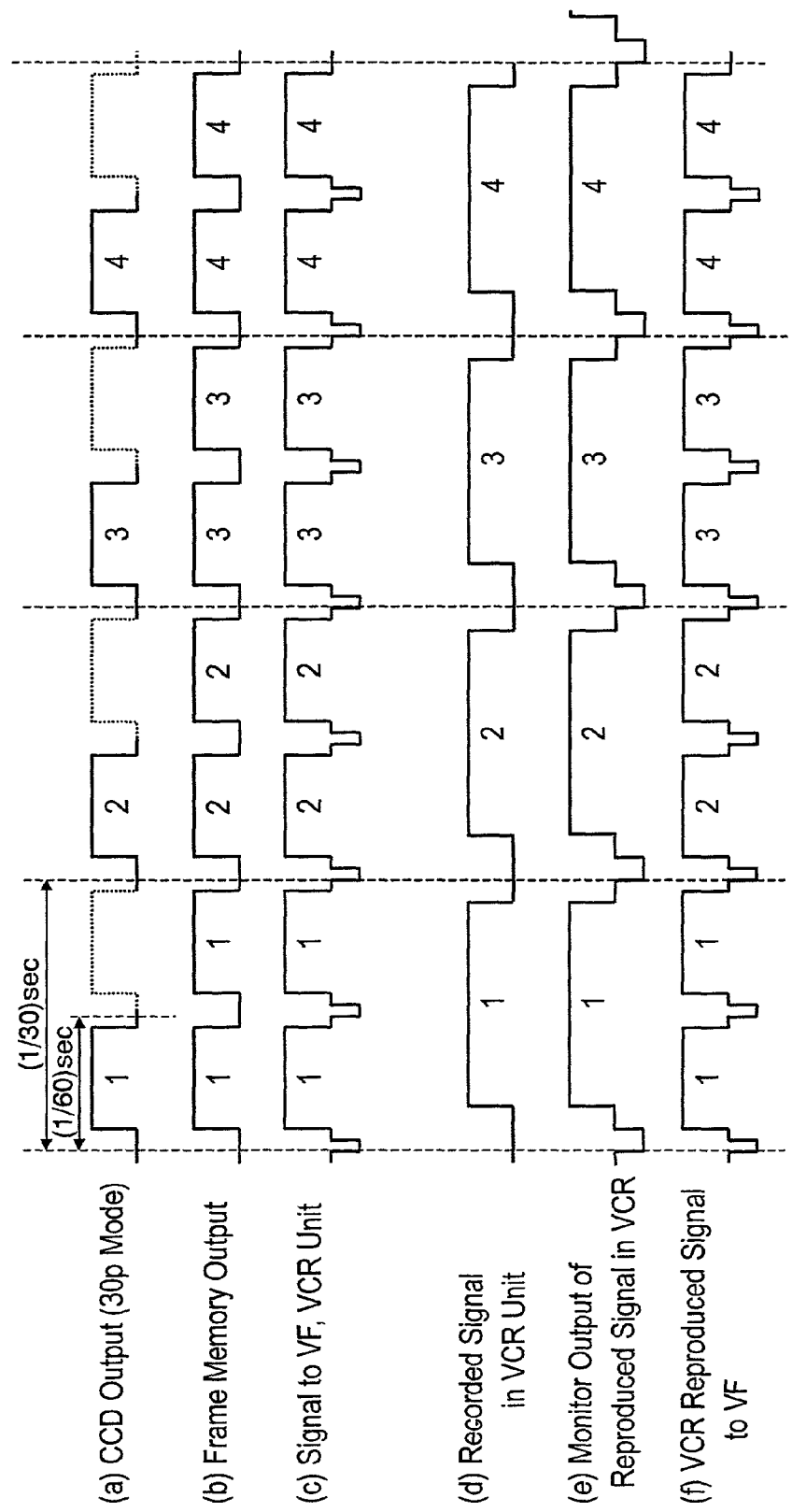
FIG. 11 is a signal waveform diagram of the imaging apparatus according to embodiment 4.

FIG. 11 shows waveforms in the apparatus. When the apparatus is set to a 30$p$ mode with a mode switching signal, the charge coupled device (CCD), frame memory, viewfinder (VF), and a video cassette recorder (VCR) unit output signals shown in FIG. 11($a$), FIG. 11($b$), and FIG. 11($c$), respectively. The VCR unit records the input signal in FIG. 11($c$) at a frame rate of the 30$p$ mode set with the mode switching signal as shown in FIG. 11($d$). So far, the operation is the same as in embodiment 1 and embodiment 3.

The reproduced signal is converted into a signal of the same type as the signal entering into the VCR unit shown in FIG. 11($f$) by a converter 30 in the first reproduced signal converter 28 shown in FIG. 10 and issued to the VF. The reproduced signal to an external monitor is selected from the signals shown in FIG. 11($e$) and FIG. 11($f$) and issued by a switching circuit 31 in the second reproduced signal converter 29.

As described in above, the reproduced signal at the same frame rate as the input signal to the VCR unit is always input to the VF. And either the signal having the same frame rate as the input signal to the VCR unit or the signal having the frame rate of the mode set with the mode switching signal is selectively output to an external monitor.

Thus, according to embodiment 4, a signal is output to other external VCR, switcher or the like at the frame rate set with the mode switching signal, i.e., at the frame rate conforming to the standard. And simultaneously, the signal is always issued to the VF at the frame rate set with the mode switching signal multiplied by (n/2). Therefore, the VF displays the signal without flicker, so that the reproduced signal sent to the external devices can be confirmed. The signal is also issued to an outside in the same format as that to the VF, so that the external monitor can display the signal without flicker.

(Exemplary Embodiment 5)

Figure 12:
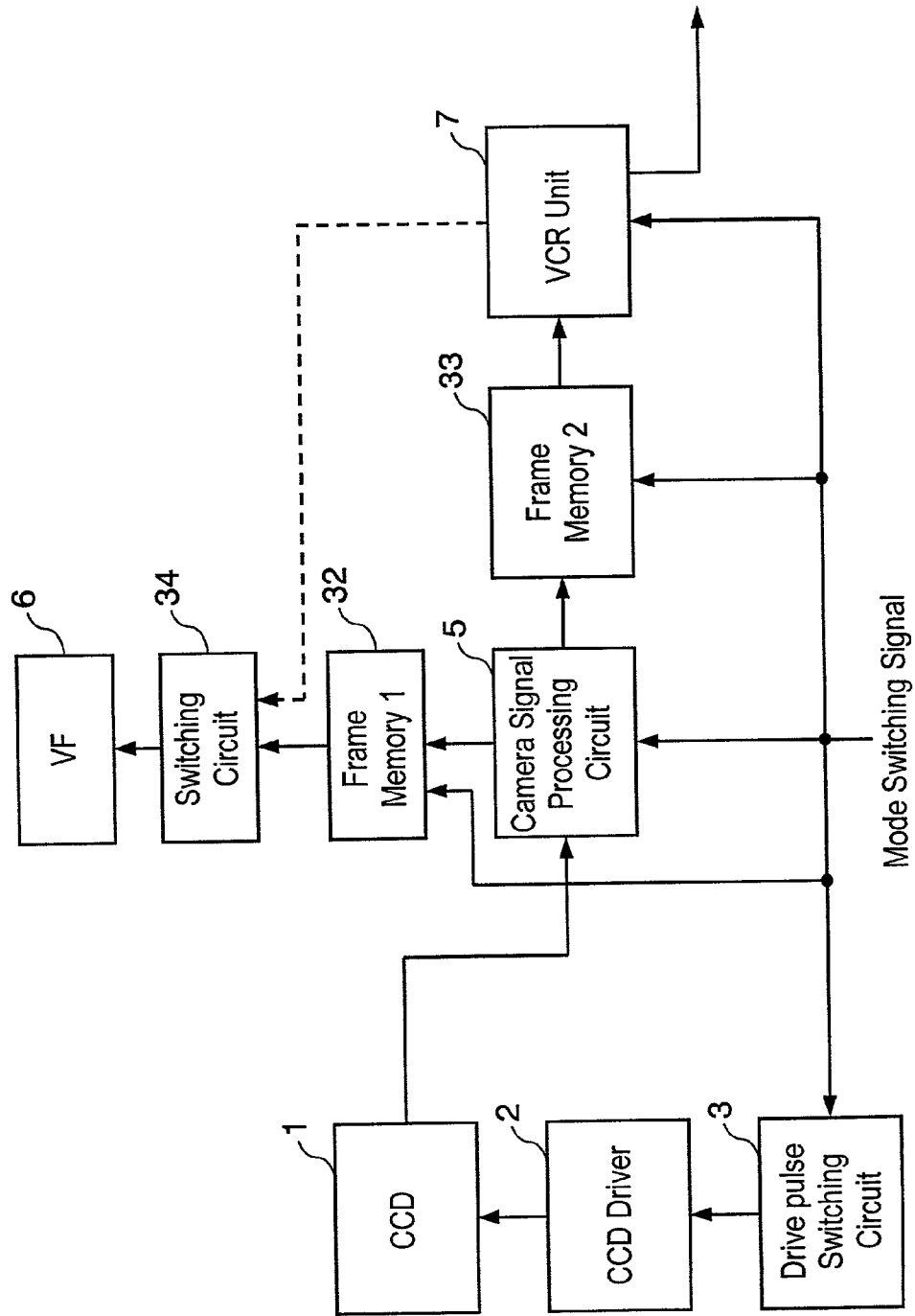
FIG. 12 is a block diagram of a VCR built-in type imaging apparatus according to exemplary embodiment 5 of the present invention.

FIG. 12 is a block diagram showing a video cassette recorder (VCR) built-in type imaging apparatus according to exemplary embodiment 5 of the present invention. The imaging apparatus includes a charge coupled device (CCD) 1 operable in a progressive scanning, a CCD driver 2, a drive pulse switching circuit 3 for switching and issuing a CCD drive pulse corresponding to a multi-frame rate, a camera signal processing circuit 5 for performing a camera process, a viewfinder (VF) 6 corresponding to progressive scanning, a VCR unit 7 for recording and reproducing a multi-frame rate signal, a first frame memory 32 for processing a signal for the VF, a second frame memory 33 for processing a signal for the unit VCR, and a switching circuit 34. The imaging apparatus according to embodiment 5 differs from embodiment 1 in that frame memories are provided between the camera signal processing circuit 5 and the VF 6 and the VCR unit 7, instead of the frame memory disposed between the camera signal processing circuit 5 and CCD 1.

An operation of the VCR built-in type imaging apparatus according to embodiment 5 will be explained below with referring to FIG. 13.

An operation of the CCD 1, CCD driver 2, and drive pulse switching circuit 3 is the same as that in embodiment 1. Therefore, a mode switching signal is set to, for example, a 30$p$ mode, the CCD outputs a signal shown in FIG. 13($a$). This signal is put into the camera signal processing circuit 5. Then, after being processed at the frame rate of a 60$p$ mode, the signal is issued to the first and second frame memories 32, 33. The first frame memory 32 processes in the same manner as that in embodiment 1 and issues the signal shown in FIG. 13($b$) to the switching circuit 34 as duplicating the frame. The second frame memory 33 stores the signal at the frame rate of the 60*p* mode, and converts it to the frame rate of the 30*p* mode selected with the mode. In this conversion, without changing a processing clock, the number of samples in a horizontal blanking period increases to double the total number of pixels.

Figure 13:
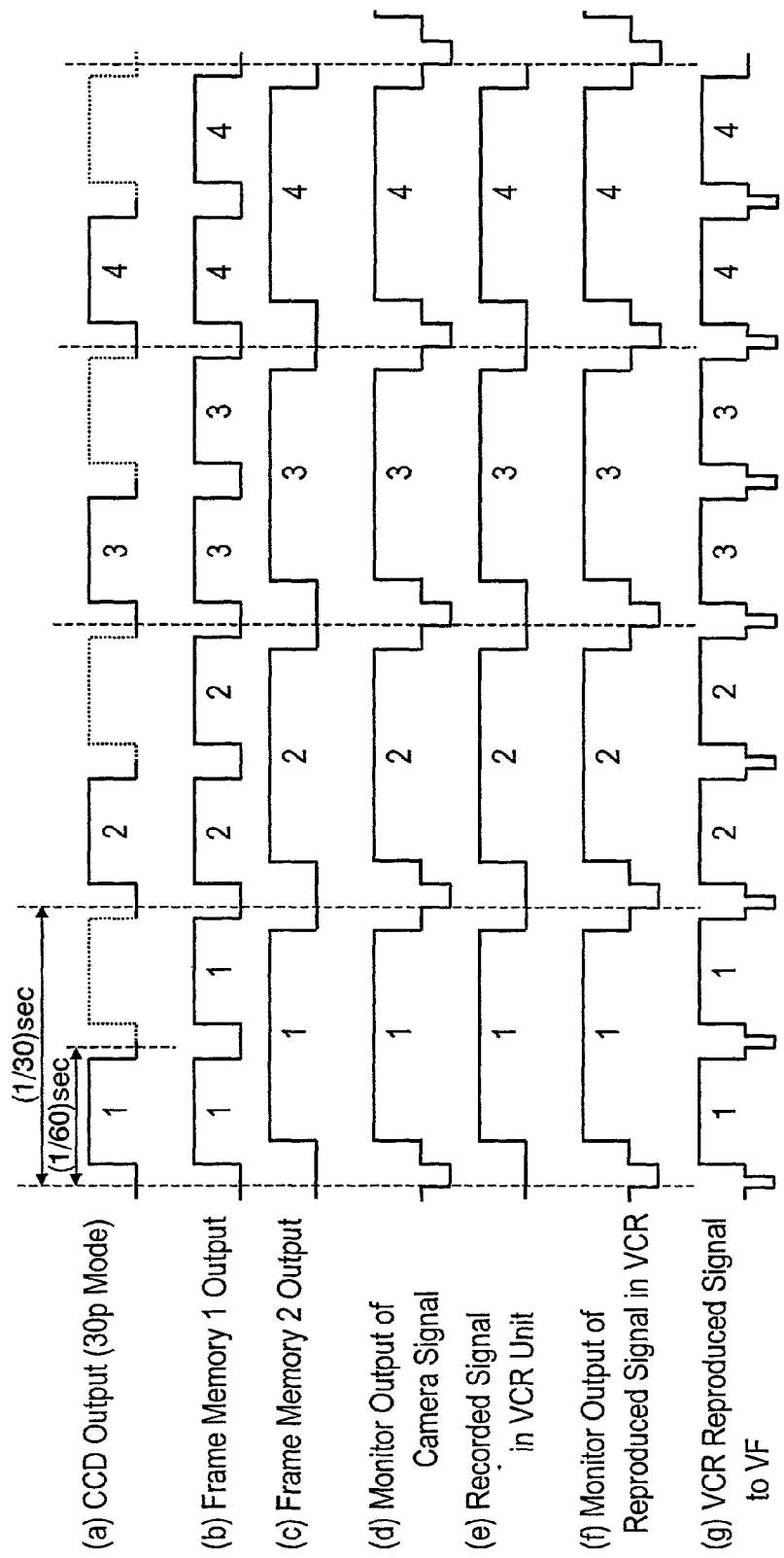
FIG. 13 is a signal waveform diagram for explaining an operation of the imaging apparatus according to embodiment 5.

The converted signal shown in FIG. 13(*e*) is sent to the VCR unit 7. The VCR unit 7 records this signal at the same frame rate, and this signal is also issued to an outside as a monitor signal, for example, as a serial digital interface (SDI) signal as shown in FIG. 13(*d*).

In the VCR unit 7 according to embodiment 4, a monitor output of a reproduced signal is selected as shown in FIG. 13(*f*), and the reproduced signal to the VF is issued as shown in FIG. 13(*g*). The switching circuit 30 selects the signals of FIG. 13(*b*) and FIG. 13(*g*) and issues them to the VF 6.

Thus, according to embodiment 5, even a signal having a frame rate of the mode, 30 frames/sec or less, similarly, may be displayed on the VF without flicker at a frame rate multiplied by (n/2) (where n is an integer). Besides, the CCD has a vertical transfer time shortened and has a performance prevented from a deterioration. Thus, the same effects as in embodiment 1 are obtained. Further, a camera monitor signal can be issued to an outside at the frame rate of the preset mode, that is, in the standard signal format, and can be input to the VCR for backup.

(Exemplary Embodiment 6)

Figure 14:
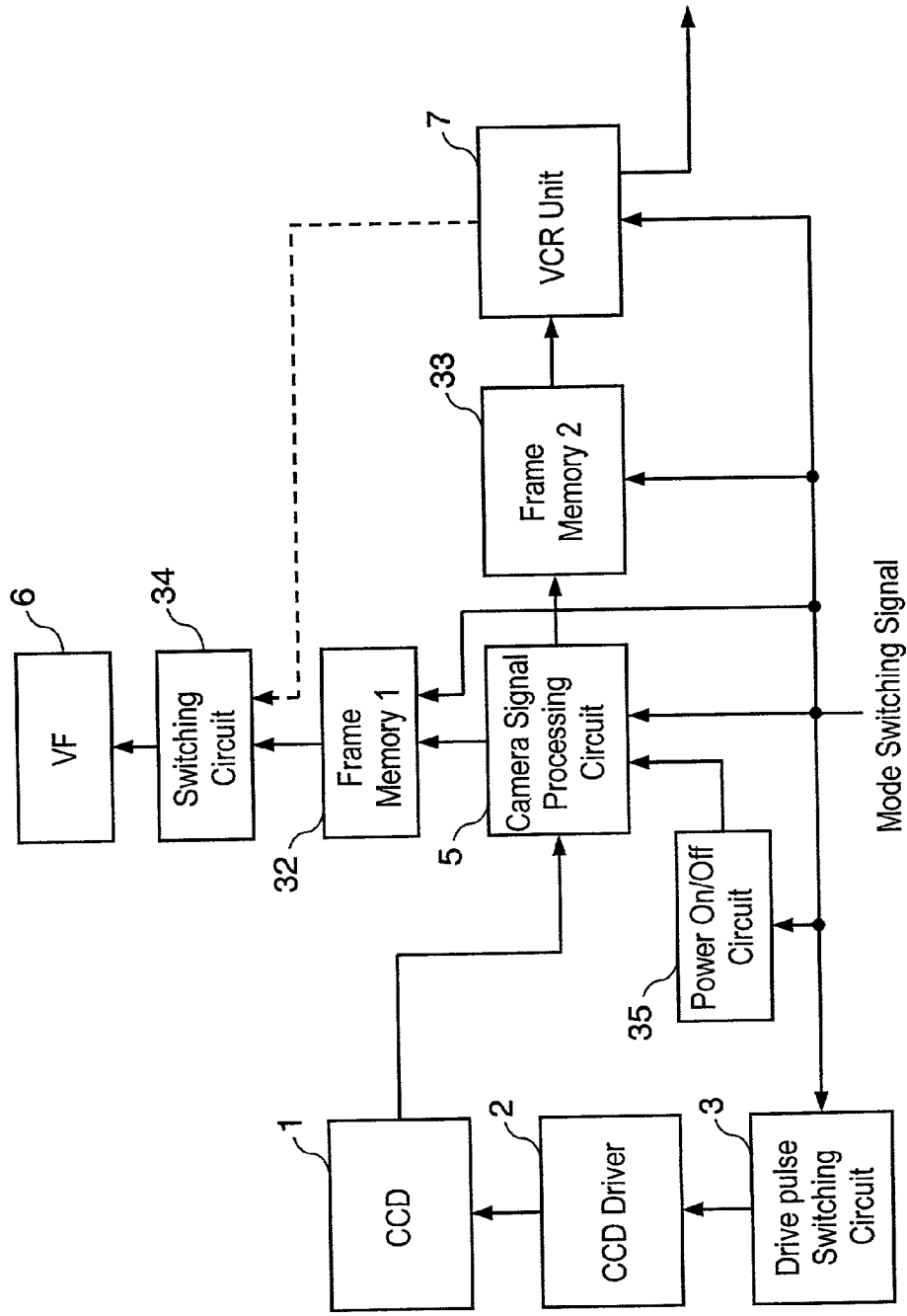
FIG. 14 is a block diagram of a VCR built-in type imaging apparatus according to exemplary embodiment 6 of the present invention.

FIG. 14 is a block diagram of a video cassette recorder (VCR) built-in type imaging apparatus according to embodiment 6 of the present invention. The imaging apparatus includes a charge coupled device (CCD) 1 operable in a progressive scanning, a CCD driver 2, a drive pulse switching circuit 3 for switching and issuing a CCD drive pulse corresponding to a multi-frame rate, a camera signal processing circuit 5 for performing a camera process, a viewfinder (VF) 6 corresponding to a progressive scanning, a VCR unit 7 for recording and reproducing a multi-frame rate signal, a first frame memory 32 for processing a signal for the VF, a second frame memory 33 for processing a signal for the VCR unit, a switching circuit 34, and a power on/off circuit 35 for turning on and off the camera signal processing circuit 5. This embodiment differs from embodiment 5 in that the power on/off circuit 35 is provided. Hence, the explanation of an operation of other parts will be omitted.

An operation of the VCR built-in type imaging apparatus according to embodiment 6 will be explained below with referring to FIG. 15.

Figure 15:
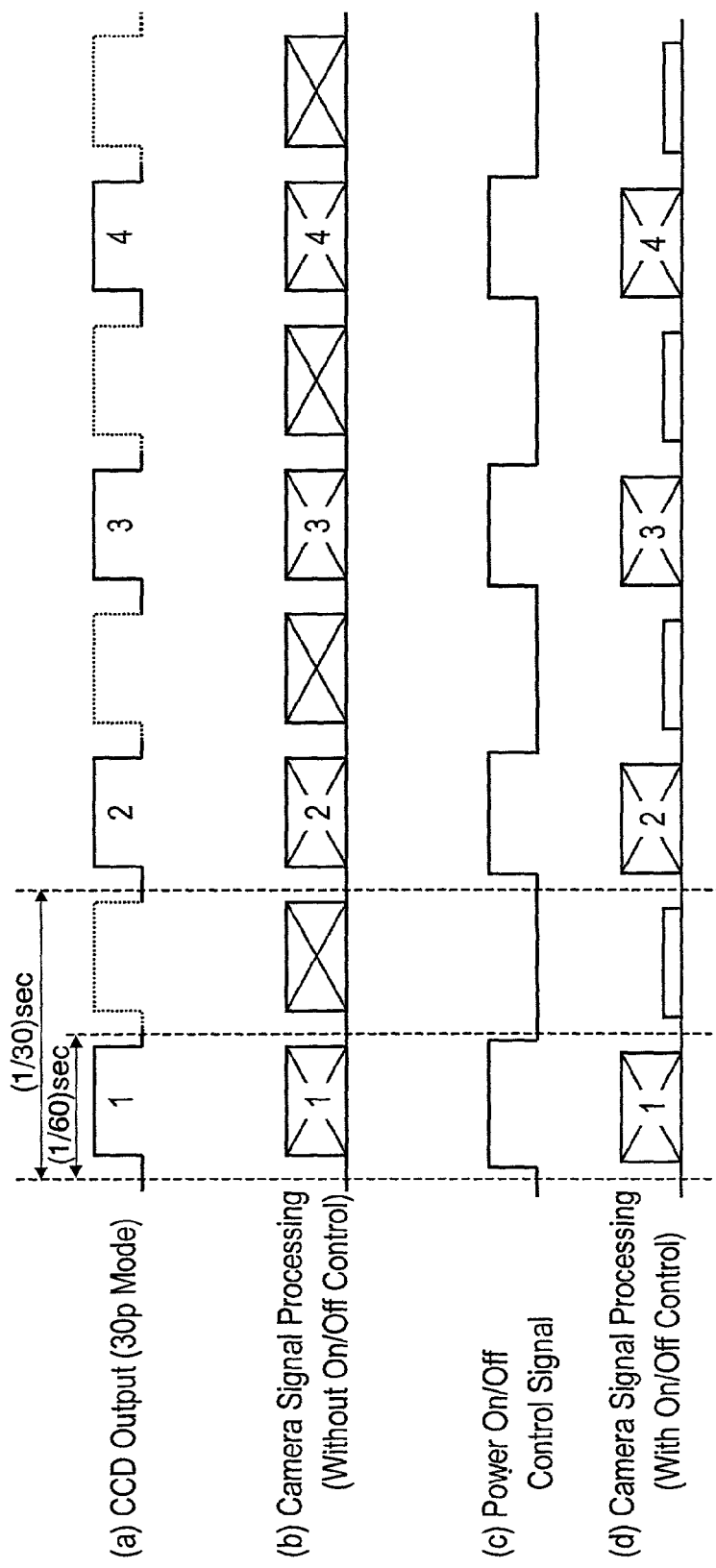
FIG. 15 is a signal waveform diagram for explaining an operation of the imaging apparatus according to embodiment 6.

Similarly to embodiment 5, when a mode switching signal is set to, for example, a 30*p* mode, the CCD outputs a signal shown in FIG. 15(*a*). This signal is put into the camera signal processing circuit 5, and is processed at the frame rate of a 60*p* mode. The camera signal processing circuit 5 performs the camera process as shown in FIG. 15(*b*) even in the CCD output undesired signal period indicated by a dotted line in FIG. 15(*a*). Accordingly, the processing circuit 5 consumes an unnecessary power. For example, a large scale integrated circuit (LSI) containing a digital process consumes an electric power even when receiving only a processing clock is even if the input signal is a constant signal.

In embodiment 6, the power on/off circuit 35 generates a power on/off control signal as shown in FIG. 13(*c*), and turns off the camera signal processing circuit 5 in the undesired signal period. As a result, the processing circuit 5 operates as shown in FIG. 13(*d*), and the power consumption is reduced.

Thus, according to embodiment 6, similarly to embodiment 5, even a signal having the frame rate of 30 frames/sec or less, similarly, can be displayed on the VF without flicker at a frame rate multiplied by (n/2) (where n is an integer). Besides, the CCD has the vertical transfer time shortened, and has a performance prevented from deterioration. Further, a camera monitor signal is output to an outside at the frame rate of the set mode, that is, in the standard signal format, and can be input to the VCR for backup. Moreover, the power consumption at a low frame rate is reduced.

(Exemplary Embodiment 7)

Figure 16:
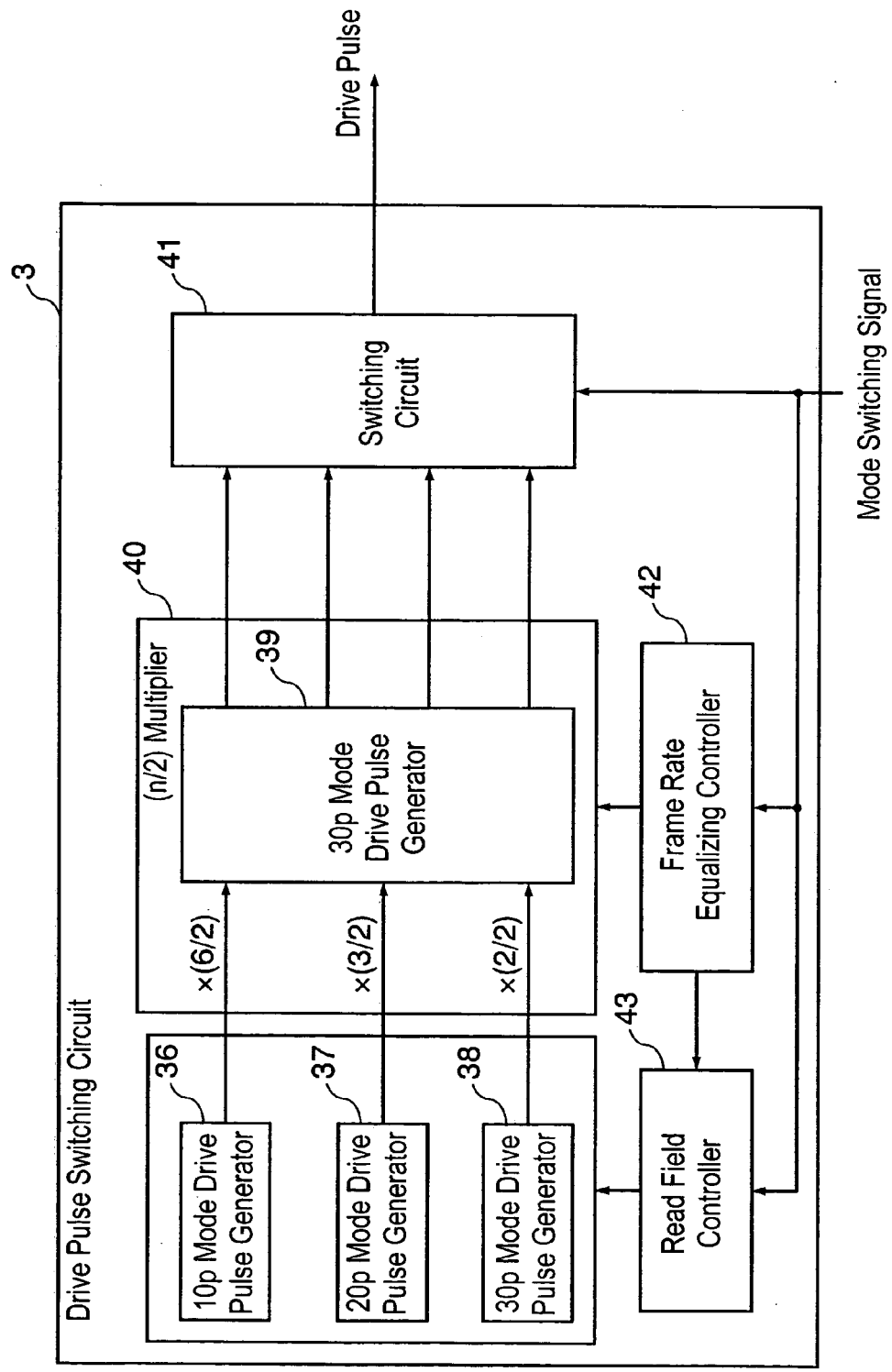
FIG. 16 is a block diagram of an internal structure of a drive pulse switching circuit in a VCR built-in type imaging apparatus according to exemplary embodiment 7 of the present invention.

FIG. 16 is a block diagram of a drive pulse switching circuit in a video cassette recorder (VCR) built-in type imaging apparatus according to embodiment 7 of the present invention. The switching circuit includes drive pulse generators 36, 37, 38 of segment frame (SF) formats of a 15*p* mode, 20*p* mode, and 30*p* mode set by the mode switching signal, respectively, a drive pulse generator 39 of an SF format of the 30*p* mode for converting other rate than a CCD read pulse to that of a rate of the 30*p* mode, and an (n/2) multiplier 40. The (n/2) multiplier 40 includes a 30*p* (SF format) drive pulse generator. A frame rate equalizing controller 42 controls for converting the frame rates of the 15*p* mode, 20*p* mode, and 30*p* mode to a common SF format of the 30*p* mode. A read field controller 43 controls a read field of each drive pulse generator according to the value of n set in the frame rate equalizing controller 42.

The imaging apparatus according to embodiment 7 differs from that according to embodiment 1 and embodiment 2 in that the read field controller 43 is provided in the drive pulse switching circuit 3. The other circuits and the operation are the same, and hence, the explanation will be omitted.

The operation of the VCR built-in type imaging apparatus of embodiment 7 having such configuration is explained below by referring to FIG. 17 and FIG. 18.

The drive pulse generating circuits 36 to 38, different from the corresponding circuits in embodiment 2, generate progress scanning driving pulse of SF format. Each drive pulse is, similarly to embodiment 2, converted into a CCD drive pulse of a common frame rate of an SF format 30*p* mode by the frame rate equalizing controller 42 and (n/2) multiplier 40. As a result, the drive pulse shown in FIG. 17(*c*) is issued. Herein, in the 30*p* mode is, other pulses than a CCD read pulse are nearly the same as the drive pulses of a field frequency 60 Hz interlacing scanning mode (60*i* mode) shown in FIG. 17(*b*). A signal shown in FIG. 17(*d*) is output in which the vertical transfer pulses are issued in the odd and even line fields with an interval at a blanking period. The transfer pulses may be issued continuously to prevent a performance of the CCD from deteriorate.

Figure 17:
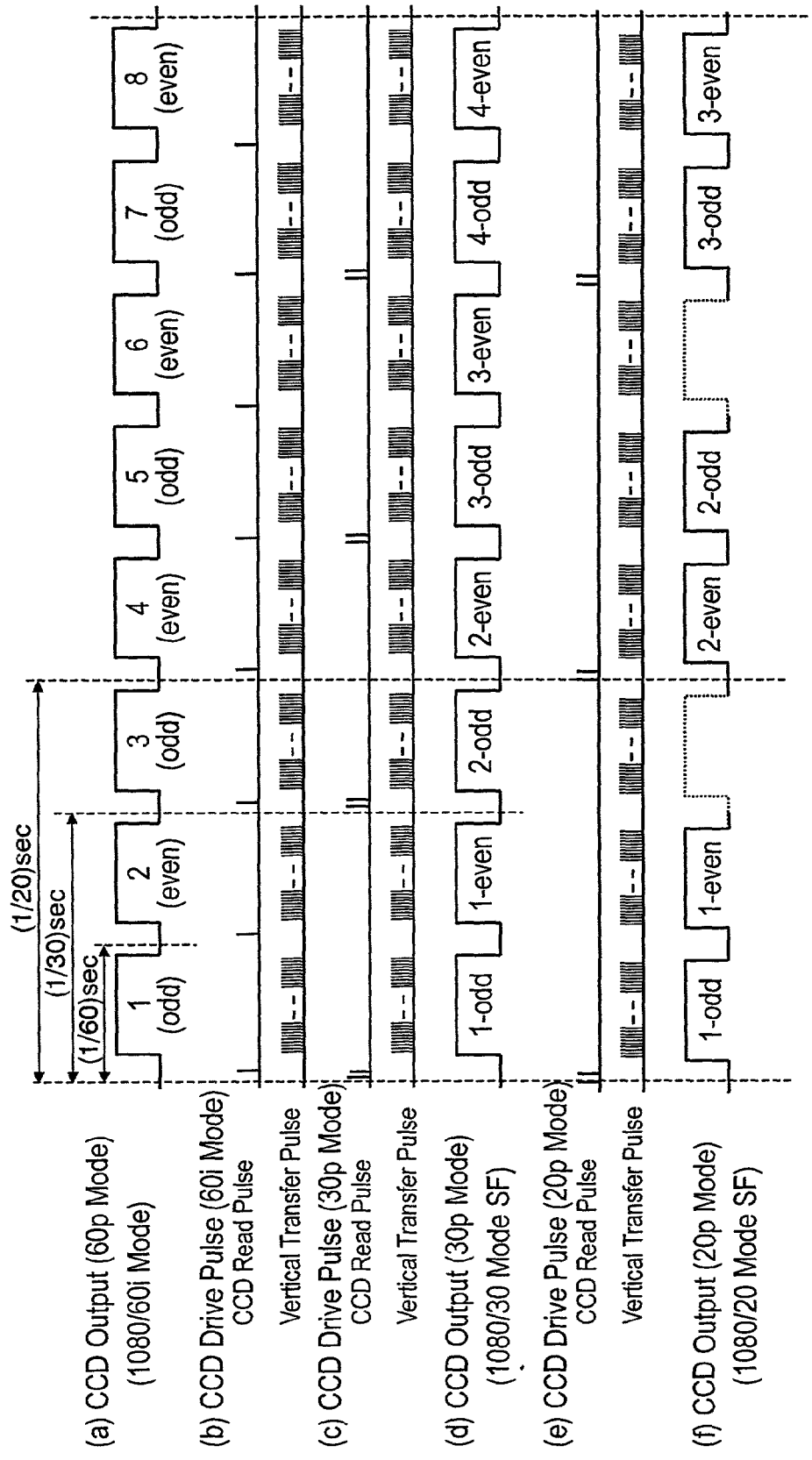
FIG. 17 is a signal waveform diagram for explaining an operation of the imaging apparatus according to embodiment 7.

Similarly, a converted CCD drive pulse in a 20*p* mode is shown in FIG. 17(*e*). As shown in FIG. 17(*f*), the read field controller 43 controls the CCD output right after a CCD read pulse so that the output order of an odd line field and even line field may be exchanged alternately in every frame. That is, as in the 20*p* mode, when the value of n of the (n/2) multiplier 40 is an odd number, the order of read fields is exchanged alternately in every frame. And when the value of n is even, fields are issued always in the same order.

Figure 18:
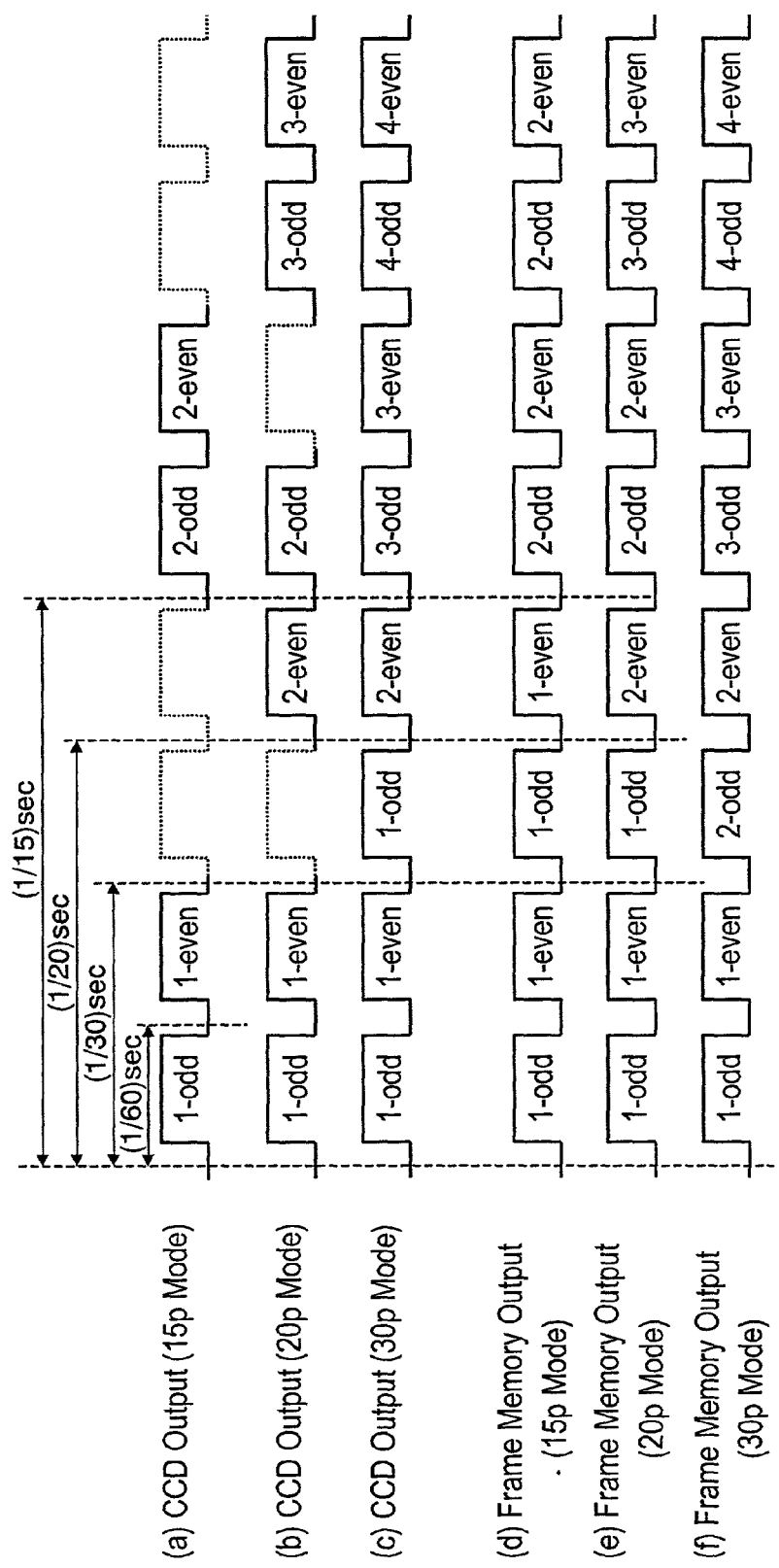
FIG. 18 is a signal waveform diagram for explaining the operation of the imaging apparatus according to embodiment 7.
Figure 19:
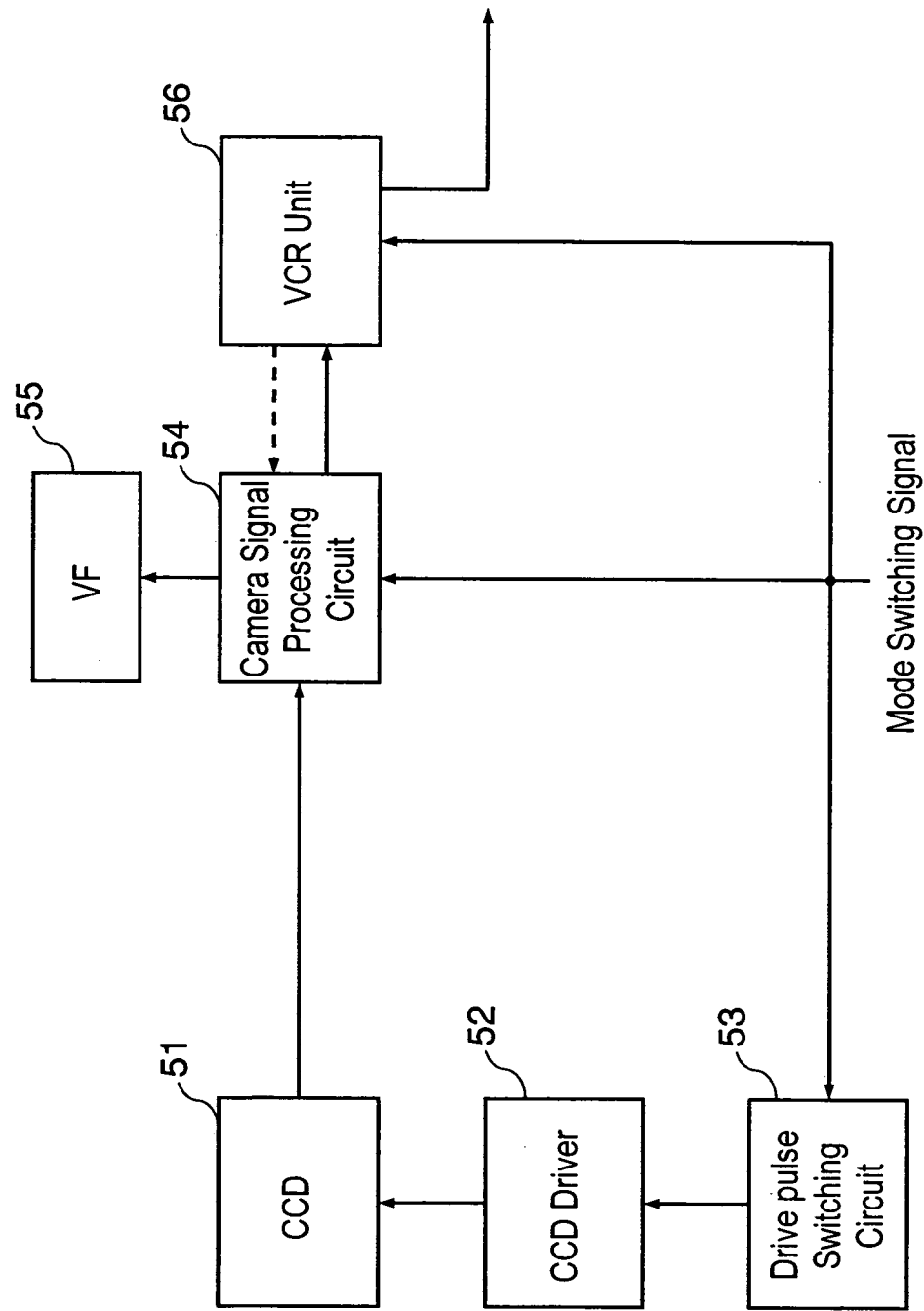
FIG. 19 is a block diagram of a circuit configuration of a conventional VCR built-in type imaging apparatus.
Figure 20:
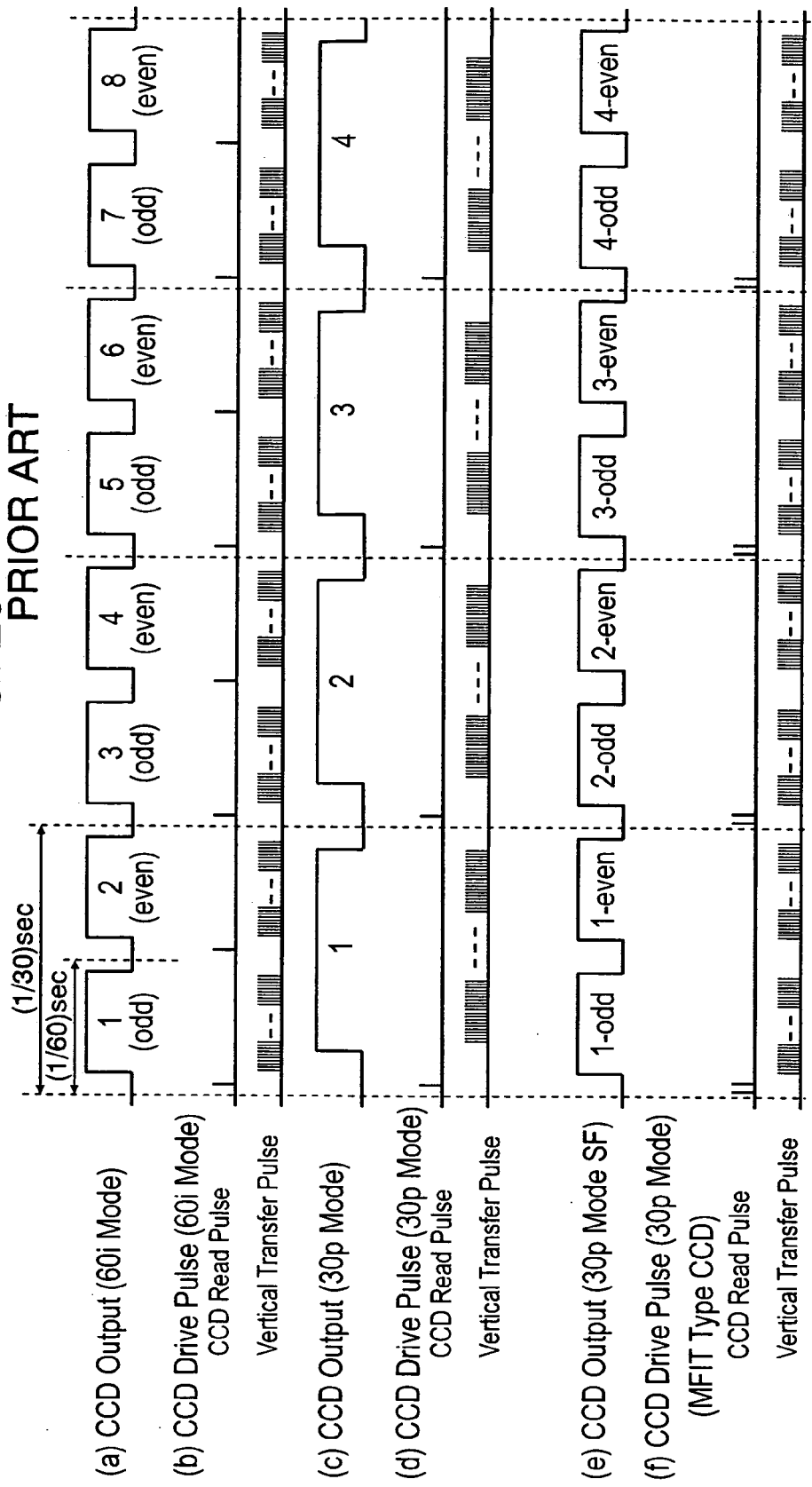
FIG. 20 is a signal waveform diagram for explaining an operation of the conventional VCR built-in type imaging apparatus.

The CCD output on the basis of this control method is shown in FIG. 18(*a*) through FIG. 18(*c*). In the 15*p* mode (n=4) and 30*p* mode (n=2), the even and odd fields are always output in the same order. Only in the 20*p* mode (n=3), the order of the odd and even fields is exchanged and issued alternately in every reading of one frame. The frame memory, upon receiving these signals, in the 15*p* mode as shown in FIG. 18(d), duplicates 1-odd, 1-even, 2-odd, and 2-even, . . . in one frame. The frame memory, in the 20p mode, duplicates 1-odd, and 2-even, . . . of 0.5 frame as shown in FIG. 18(e). The memory, in the 30p mode, directly outputs the signal as shown in FIG. 18(f). Thus, in each frame rate, the continuity of odd and even fields, that is, the SF format is maintained, and the signal is issued to the camera signal processing circuit of the next stage. The subsequent operation is the same as that in embodiments 1 and 2.

Thus, according to embodiment 7 of the invention, similarly to embodiments 1 and 2, a low speed frame rate signal is stably displayed in the VF, and deterioration of performance of the CCD is prevented. Thus, the signal is conducted stably to the VCR unit in the SF format.

The drive pulse generators including the (n/2) multiplier in the drive pulse switching circuit 3 may be, similarly to embodiments 1 and 2, realized by a single generator, for generating necessary CCD drive pulses with being controlled programmably.

In this embodiment, the read field controller 43 controls the reading of the CCD and maintains the continuity of the SF format, the frame memory may perform the same role as the control circuit 43.

In all foregoing embodiments, doubling a speed is realized, as explained in the prior art, easily by decreasing the number of samples in a blanking period, so that the total number of horizontal pixels may be half at the same clock. Moreover, the frames may be duplicated, for example, by switching the two frame memories for writing and reading alternately.

What is claimed is:

1. A charge coupled device (CCD) imaging apparatus comprising:
   a drive pulse switching circuit for generating CCD read pulses periodically at a first frame rate, and for generating a CCD drive pulse at a second frame rate being n/2 times the first frame rate, n being an integer greater than 2;
   a CCD operable in a progressive scanning mode, said CCD capturing an image responsive to the CCD read pulses;
   a CCD driver for driving said CCD with the CCD drive pulse to allow said CCD to output a signal corresponding to the captured image;
   a frame memory for storing a signal of the signal output from said CCD corresponding to one frame after each of the CCD read pulses, and for reading out the stored signal n/2 times; and
   a camera signal processing circuit for receiving an output signal of said frame memory and performing a camera process.

2. The CCD imaging apparatus of claim 1, further comprising a recorder unit for recording a signal output from said camera signal processing circuit at the first frame rate.

3. The CCD imaging apparatus of claim 2, further comprising a first reproduced signal converter being capable of outputting a reproduced signal of said recorder unit at the first and second frame rates.

4. The CCD imaging apparatus of claim 3, further comprising:
   a viewfinder for displaying an output signal of said camera signal processing circuit; and
   a second reproduced signal converter for converting the reproduced signal from said recorder unit to the second frame rate, and for outputting the converted signal to said viewfinder.

5. The CCD imaging apparatus of claim 1,
   wherein, when the first frame rate is below a specified number, said drive pulse switching circuit generates the CCD read pulse at the first frame rate, and generates the CCD drive pulse at the second frame rate, and
   wherein, when the first frame rate is below the specified number, said frame memory stores the output signal of said CCD after the CCD read pulse, and reads out the stored output signal of said CCD n/2 times.

6. The CCD imaging apparatus of claim 5, wherein the specified number is 30 frames/sec.

7. The CCD imaging apparatus of claim 6, wherein the first frame rate is 24 frames/sec, 25 frames/sec, or 30 frames/sec, and n is 2.

8. The CCD imaging apparatus of claim 1,
   wherein said drive pulse switching circuit includes a frame rate equalizing controller for enabling said CCD to output both a signal of the first frame rate and a signal of a third frame rate at the second frame rate, the second frame rate being a common multiple of the first and third frame rates.

9. The CCD imaging apparatus of claim 8, wherein the second frame rate is 60 frames/sec or 48 frames/sec.

10. The CCD imaging apparatus of claim 9, further comprising a recorder unit for recording a signal from said camera signal processing circuit at the first and third frame rates.

11. The CCD imaging apparatus of claim 10, wherein said recorder unit reproduces a signal at the second frame rate.

12. The CCD imaging apparatus of claim 10, further comprising a first reproduced signal converting circuit for issuing a reproduced signal of said recorder unit at the first and second frame rates.

13. The CCD imaging apparatus of claim 12, further comprising:
   a viewfinder for displaying an output signal of said camera signal processing circuit; and
   a second reproduced signal converter for converting a reproduced signal of said recorder unit to the frame rate (n/2) times as high as the first frame rate, and for issuing the converted reproduced signal to said viewfinder.

14. The CCD imaging apparatus of claim 1,
   wherein said CCD is of a multiple frame interline transfer (MFIT) type for reading out a progressive scanning signal divided into odd and even fields,
   wherein said frame memory outputs the signal in one frame in a segment frame (SF) format by dividing the signal into odd and even fields,
   wherein said drive pulse switching circuit comprises a read field controller for generating a CCD drive pulse to control an order of the odd and even fields being output from said CCD, and for changing the order of the odd and even fields every one frame when n is an odd number at every frame.

* * * * *

UNITED STATES PATENT AND TRADEMARK OFFICE
CERTIFICATE OF CORRECTION

| | |
|---|---|
| PATENT NO. | : 7,015,965 B2 |
| APPLICATION NO. | : 09/880297 |
| DATED | : March 21, 2006 |
| INVENTOR(S) | : Asada et al. |

Page 1 of 1

It is certified that error appears in the above-identified patent and that said Letters Patent is hereby corrected as shown below:

In column 12, line 17 of the Letters Patent, in claim 7, "30 frames/sec, and n is 2." should read --30 frames/sec.--.

Signed and Sealed this

Twenty-ninth Day of August, 2006

JON W. DUDAS
*Director of the United States Patent and Trademark Office*